United States Patent
Piazza et al.

(10) Patent No.: US 11,873,767 B2
(45) Date of Patent: Jan. 16, 2024

(54) GEARBOX CONFIGURATIONS FOR CLOCKWISE AND COUNTERCLOCKWISE PROPELLER ROTATION

(71) Applicants: GE Avio S.r.l., Rivalta di Torino (IT); General Electric Company, Schenectady, NY (US)

(72) Inventors: Andrea Piazza, Rivalta di Torino (IT); Darek Zatorski, Evendale, OH (US); Juraj Hrubec, Prague (CZ); David M. Ostdiek, Evendale, OH (US)

(73) Assignees: GE Avio S.R.L.; General Electric Company, Schenectady, NY (US)

( * ) Notice: Subject to any disclaimer, the term of this patent is extended or adjusted under 35 U.S.C. 154(b) by 0 days.

(21) Appl. No.: 17/508,545

(22) Filed: Oct. 22, 2021

(65) Prior Publication Data
US 2023/0130860 A1   Apr. 27, 2023

(51) Int. Cl.
*F02C 7/36* (2006.01)
*F01D 1/24* (2006.01)

(52) U.S. Cl.
CPC .............. *F02C 7/36* (2013.01); *F01D 1/24* (2013.01); *F05D 2220/36* (2013.01); *F05D 2260/40311* (2013.01)

(58) Field of Classification Search
CPC ...... F02C 7/36; F02C 7/06; F01D 1/24; F05D 2220/36; F05D 2240/54; F05D 2260/40311; F05D 2260/98; F16H 1/46; F16H 2057/085
See application file for complete search history.

(56) References Cited

U.S. PATENT DOCUMENTS

| | | | | |
|---|---|---|---|---|
| 4,220,057 A | * | 9/1980 | Kronogard | F02C 7/36 60/792 |
| 4,856,377 A | * | 8/1989 | Goudreau | F16H 1/28 475/331 |
| 5,137,425 A | | 8/1992 | Rohra et al. | |
| 7,144,349 B2 | | 12/2006 | Mitrovic | |
| 8,939,714 B1 | * | 1/2015 | McCune | F02K 3/06 415/122.1 |
| 9,771,878 B2 | | 9/2017 | Lu et al. | |

(Continued)

FOREIGN PATENT DOCUMENTS

| | | | | |
|---|---|---|---|---|
| EP | 0273527 A2 | * | 12/1987 | ............... F02C 6/20 |
| WO | WO201262976 | | 5/2012 | |
| WO | WO-2014113372 A1 | * | 7/2014 | .............. F02C 3/073 |

OTHER PUBLICATIONS

U.S. Appl. No. 17/347,347, filed Jun. 14, 2021.
Italian Patent Application No. 102021000015386, filed Jun. 11, 2021.

*Primary Examiner* — Sabbir Hasan
*Assistant Examiner* — Joshua R Beebe
(74) *Attorney, Agent, or Firm* — Klarquist Sparkman, LLP

(57) ABSTRACT

A gear assembly for use with a turbomachine comprises a sun gear, a plurality of planet gears, and a ring gear. The gear assembly is connected to an input shaft and an output shaft. The sun gear is configured to rotate about a longitudinal centerline of the gear assembly, and is driven by the input shaft. A component of the gear assembly drives the output shaft. The gear assembly further comprises an output shaft reversal mechanism configured to reverse the rotational direction of the output shaft.

14 Claims, 16 Drawing Sheets

(56) References Cited

U.S. PATENT DOCUMENTS

| | | | |
|---|---|---|---|
| 9,835,093 B2 | 12/2017 | Golshany et al. | |
| 10,465,606 B2 | 11/2019 | Clements et al. | |
| 10,704,410 B2 | 7/2020 | Zatorski et al. | |
| 10,823,114 B2 | 11/2020 | Clements et al. | |
| 11,339,725 B2* | 5/2022 | Simon | F16H 1/28 |
| 2014/0250860 A1* | 9/2014 | Sidelkovskiy | B64D 27/10 |
| | | | 60/39.15 |
| 2014/0363276 A1* | 12/2014 | Vetters | F02C 7/36 |
| | | | 415/124.2 |
| 2015/0354668 A1* | 12/2015 | Bouwer | B64C 27/12 |
| | | | 475/338 |
| 2016/0185460 A1* | 6/2016 | Cedoz | B64D 35/06 |
| | | | 416/128 |
| 2019/0360356 A1* | 11/2019 | Savaria | F16H 1/28 |
| 2020/0063827 A1* | 2/2020 | Courtial | F02B 75/20 |
| 2020/0070995 A1 | 3/2020 | Papas et al. | |

* cited by examiner

GEARBOX CONFIGURATIONS FOR CLOCKWISE AND COUNTERCLOCKWISE PROPELLER ROTATION

FIELD

The present subject matter relates generally to turbomachines including gear assemblies and, in particular, to gear assembly arrangements suitable for reversing the direction of the rotational output of a fan assembly driven thereby.

BACKGROUND

Gas turbine engines generally cause fan blades to rotate in the same direction on an aircraft. In some cases, it may be desirable to provide engines rotating in different directions. However, it is difficult to reverse the rotational direction of the fan blades of a gas turbine engine without significantly altering the design of the engine or the gearbox. Accordingly, there is a need for improvements in turbomachines to allow fan blades to rotate in different directions on the same aircraft.

BRIEF DESCRIPTION OF THE DRAWINGS

A full and enabling disclosure of the preferred embodiments directed to one of ordinary skill in the art, is set forth in the specification, which makes reference to the appended figures, in which.

DETAILED DESCRIPTION

Figure 1:
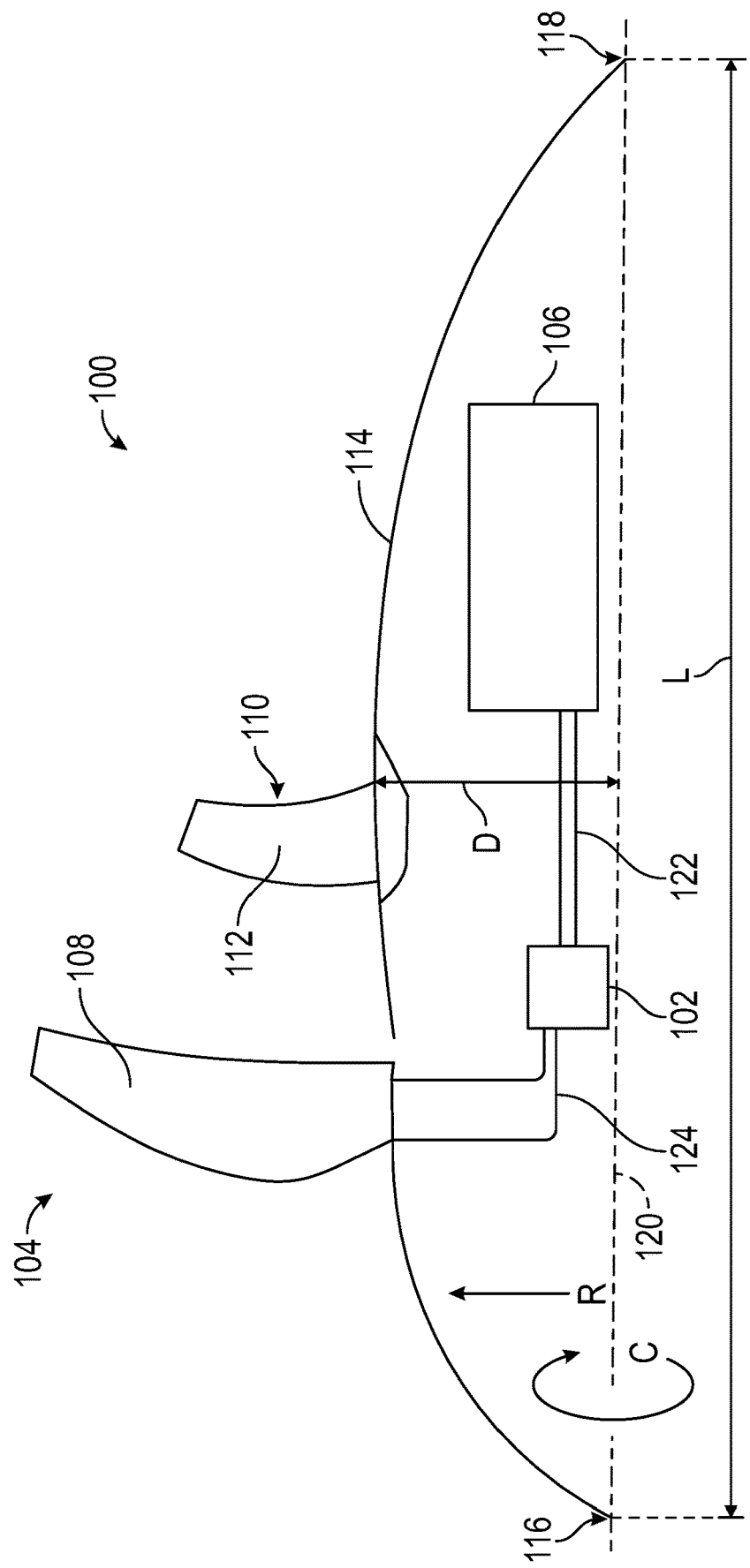
FIG. 1 is a cross-sectional schematic illustration of an exemplary embodiment of an open rotor propulsion system.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are various embodiments of modifications to the gear assemblies of a rotor engine or turbofan engine. The gear assemblies disclosed herein can reverse the direction of rotation of one or more rotor engines. The gear assemblies disclosed herein can provide significant advantages over conventional systems.

For example, the gear assemblies disclosed herein may allow for the rotor engines of an aircraft to be rotated in opposite directions, reducing or eliminating one or more of several drawbacks associated with rotation of the engines in the same direction. For example, when an aircraft has engines rotating in the same direction, one of the engines may cast debris from operation towards the fuselage of the aircraft, or towards the other engine. This necessitates armoring the fuselage against possible impacts that may cause damage to one or more of the engines of the aircraft. Rotating the rotor engines in opposite direction, depending on engine location, may reduce the risk of damage from cross engine debris by causing the debris stream from all engines to flow away from other engines and from the fuselage of the aircraft. In turn, this may reduce the need to armor or shield portions of the aircraft against debris, allowing aircraft weight to be reduced, and avoid the risk of engine damage from cross-engine debris.

Rotating the rotor engines of the aircraft in opposite directions may additionally counteract the yaw forces which can occur when the aircraft engines are rotating in the same direction. The rotation of each engine can create a left or right yaw force depending on the direction in which the engines are rotating. When the engines are rotating in the same direction, these yaw forces can interact additively, causing a persistent yaw effect to the left or the right of the aircraft. When the engines are rotating in opposite directions, the yaw forces can partially or completely cancel each other out. With yaw forces eliminated or reduced, the need to provide a counteracting force from some other source may be eliminated or reduced in turn, which can improve aircraft performance and efficiency.

Furthermore, in the case of rotor engines located near the ends or tips of the wings of the aircraft, running the engines in opposite directions may allow both engines at the wing tips to be run in the inboard up rotational direction. This allows for control over the strength and direction of the wingtip vortex, which may result in improved wing efficiency.

Additionally, rotating the rotor engines of the aircraft in opposite directions may minimize aero-acoustic interactions in the cabin space in the aircraft. This may reduce the noise and discomfort caused to passengers by the operation of the rotor engines and improve the passenger experience.

By using alternative gearbox configurations, the direction of rotation can be changed prior to the booster and/or core flowpath, which minimizes the number of unique parts required, and minimizes part count, the need for retooling, the number of spare parts and modules that must be kept for engine repair, product cost, and maintenance cost. Additionally, product design flexibility may be improved.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter (Dmax) that provides for reduced installed drag. In one embodiment, L/Dmax is at least 2. In another embodiment, L/Dmax is at least 2.5. In some embodiments, the L/Dmax is less than 5, less than 4, and less than 3. In various embodiments, it should be appreciated that the L/Dmax is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the L/Dmax, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source (e.g., input shaft 122) and provides power or torque to drive the fan assembly 104, in a circumferential direction C about the engine axis centerline 120, through a power output source (e.g., output shaft 124).

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft.

Although depicted above as an unshrouded or open rotor engine in FIG. 1, it should be appreciated that the gear assemblies disclosed herein may be applied to shrouded or ducted engines, partially ducted engines, aft-fan engines, or other turbomachine configurations, including those for marine, industrial, or aero-propulsion systems. In addition, the gear assemblies disclosed herein may also be applicable to turbofan, turboprop, or turboshaft engines.

Figure 2:
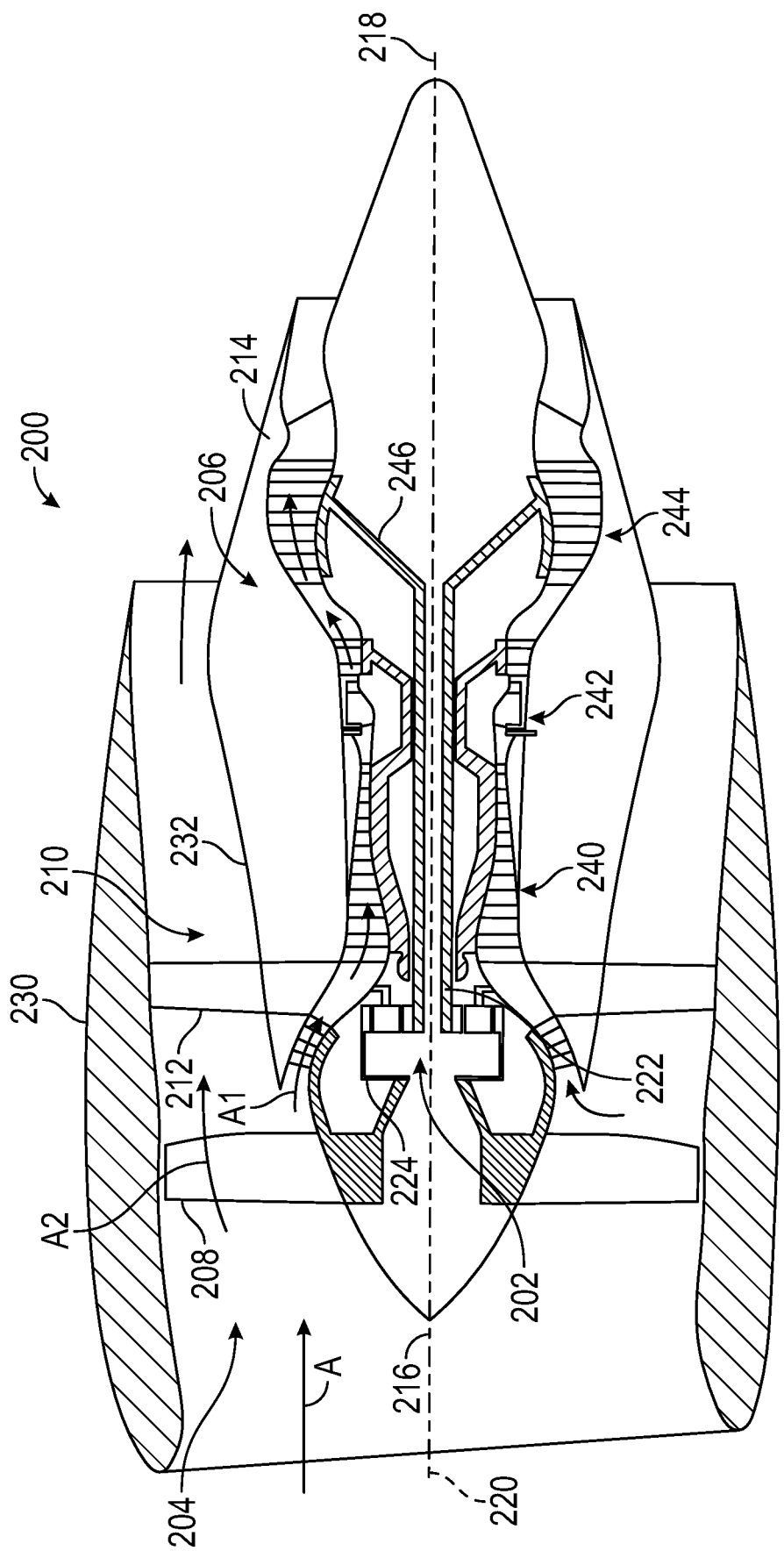
FIG. 2 is a cross-sectional schematic illustration of an exemplary embodiment of a ducted propulsion system.

For example, FIG. 2 is a cross-sectional schematic illustration of an exemplary embodiment of an engine 200 that includes a gear assembly 202 in combination with a ducted fan propulsion system. However, unlike the open rotor configuration of FIG. 1, a fan assembly 204 and its fan blades 208 are contained within an annular fan case 230 and a vane assembly 210, including a plurality of vanes 212, extend radially between a fan cowl 232 and the inner surface of the fan case 230. As discussed above, the gear assemblies disclosed herein can provide for increased gear ratios for a fixed gear envelope (e.g., with the same size ring gear), or alternatively, a smaller diameter ring gear may be used to achieve the same gear ratios.

As shown in FIG. 2, a core engine 206 is generally encased in an outer casing 214, and has a length extending from a longitudinally forward end 216 to a longitudinally aft end 218. The exemplary core engine (for a ducted or unducted engine) can include a compressor section 240, a heat addition system 242 (e.g., combustor), and an expansion section 244 together in serial flow arrangement. The core engine 206 extends circumferentially relative to an engine centerline axis 220. The core engine 206 includes a high-speed spool that includes a high-speed compressor and a high-speed turbine operably rotatably coupled together by a high-speed shaft. The heat addition system 242 is positioned between the high-speed compressor and the high-speed turbine. Various embodiments of the heat addition system 242 include a combustion section. The combustion section may be configured as a deflagrative combustion section, a rotating detonation combustion section, a pulse detonation combustion section, or other appropriate heat addition system. The heat addition system 242 may be configured as one or more of a rich-burn system or a lean-burn system, or combinations thereof. In still various embodiments, the heat addition system 242 includes an annular combustor, a can combustor, a cannular combustor, a trapped vortex combustor (TVC), or other appropriate combustion system, or combinations thereof.

The core engine 206 can also include a booster or low-speed compressor positioned in flow relationship with the high-speed compressor. The low-speed compressor is rotatably coupled with the low-speed turbine via a low-speed shaft 246 to enable the low-speed turbine to drive the low-speed compressor. The low-speed shaft 246 is also operably connected to gear assembly 202 to provide power to the fan assembly 204 via a power input source (e.g., input shaft 222), such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine 206 includes a gear assembly that is configured to transfer power from the expansion section 244 and reduce an output rotational speed at the fan assembly 204 relative to a low-speed turbine. Embodiments of the gear assemblies depicted and described herein can allow for gear ratios suitable for large-diameter unducted fans (e.g., FIG. 1) or certain turbofans (e.g., FIG. 2). Additionally, embodiments of the gear assemblies provided herein may be suitable within the radial or diametrical constraints of the core engine within the outer casing.

The gear assemblies described herein includes a gear set for decreasing the rotational speed of the fan assembly relative to the low speed (pressure) turbine. In operation, the rotating fan blades are driven by the low speed (pressure) turbine via gear assembly such that the fan blades rotate around the engine axis centerline and generate thrust to propel the engine, and hence an aircraft on which it is mounted, in the forward direction.

Figure 5:
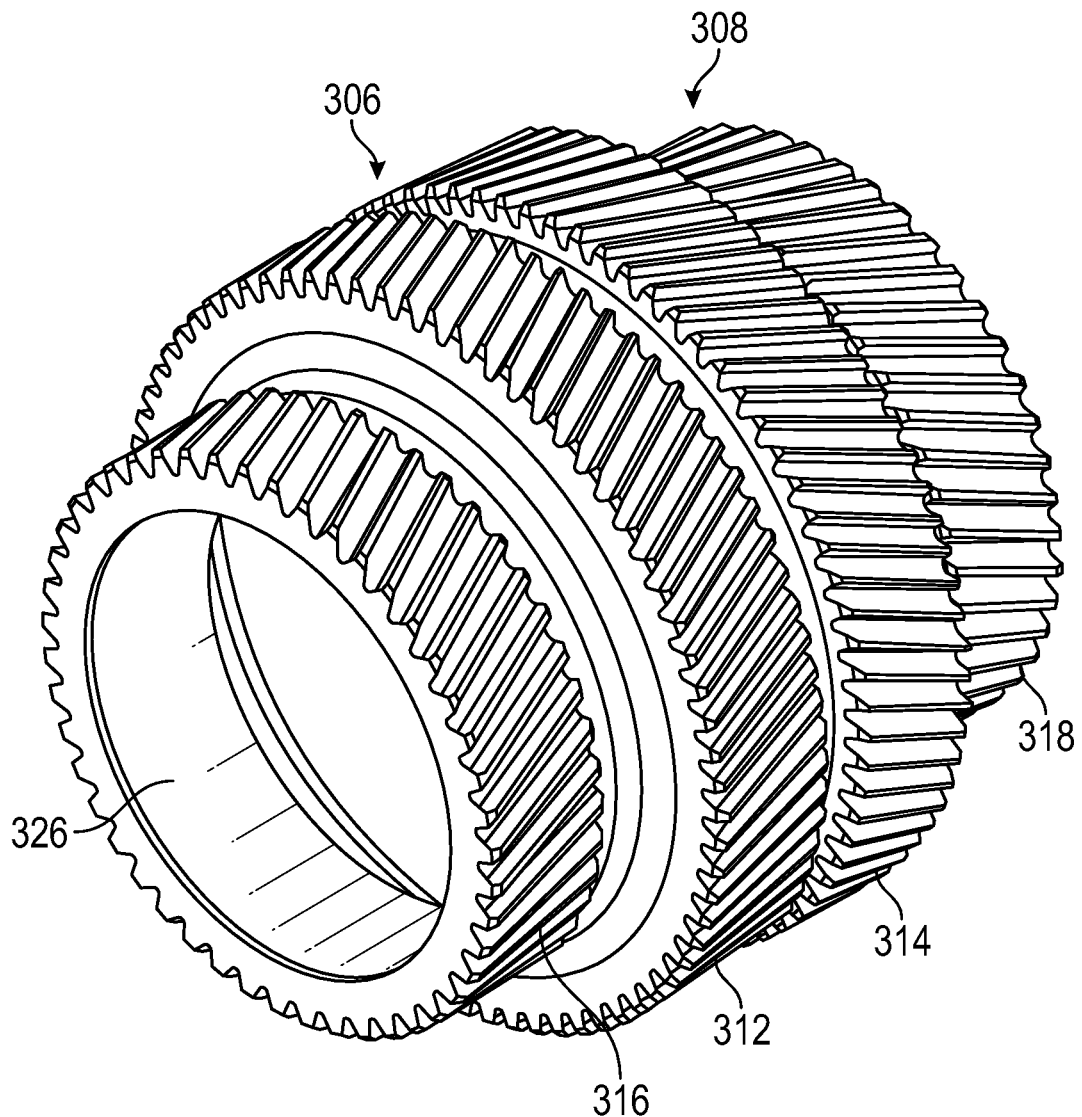
FIG. 5 is a schematic illustration of an exemplary planet gear layshaft with first and second stage planet gears.
Figure 6:
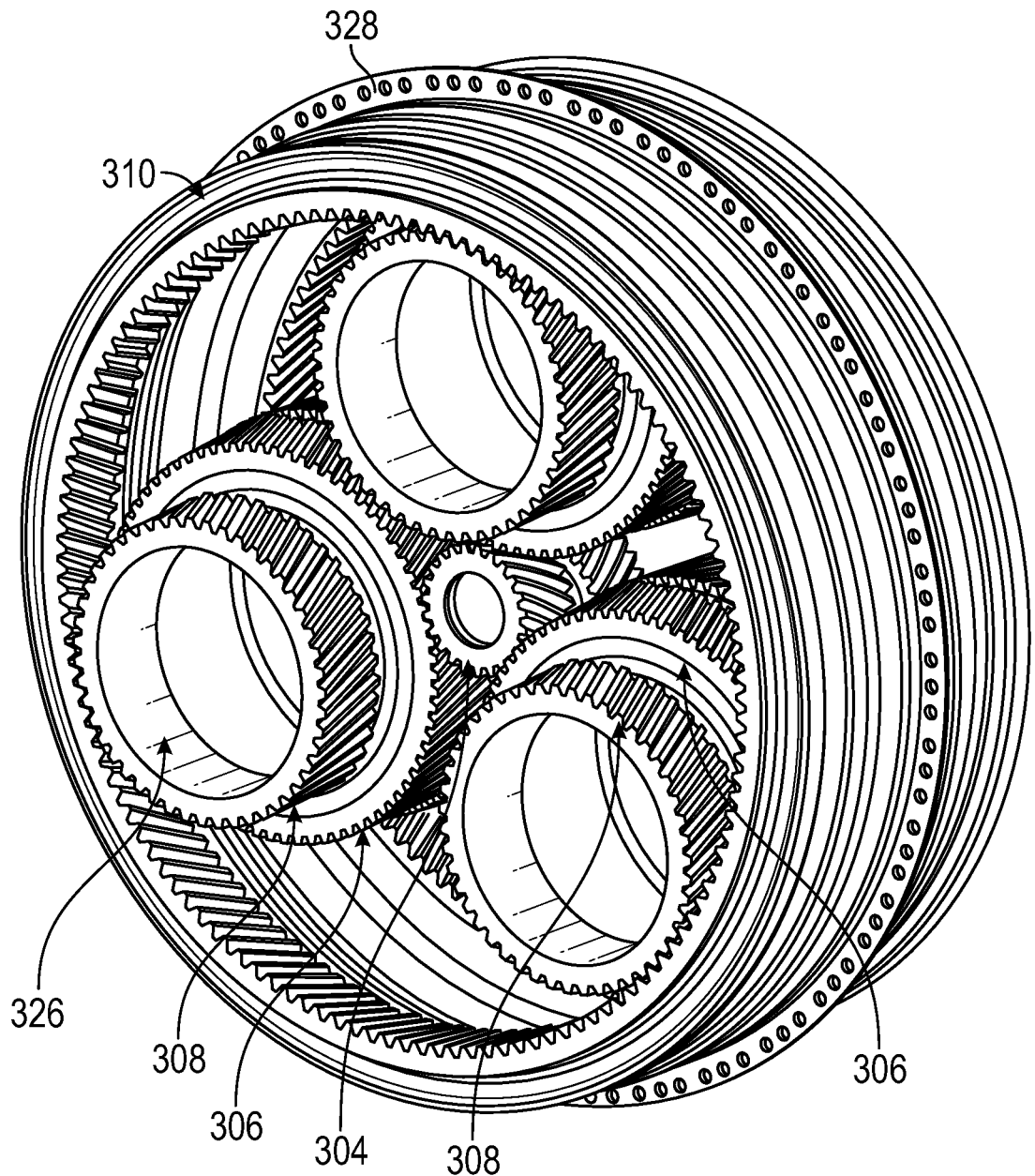
FIG. 6 is a schematic illustration of an exemplary gear assembly with compound symmetry.
Figure 7:
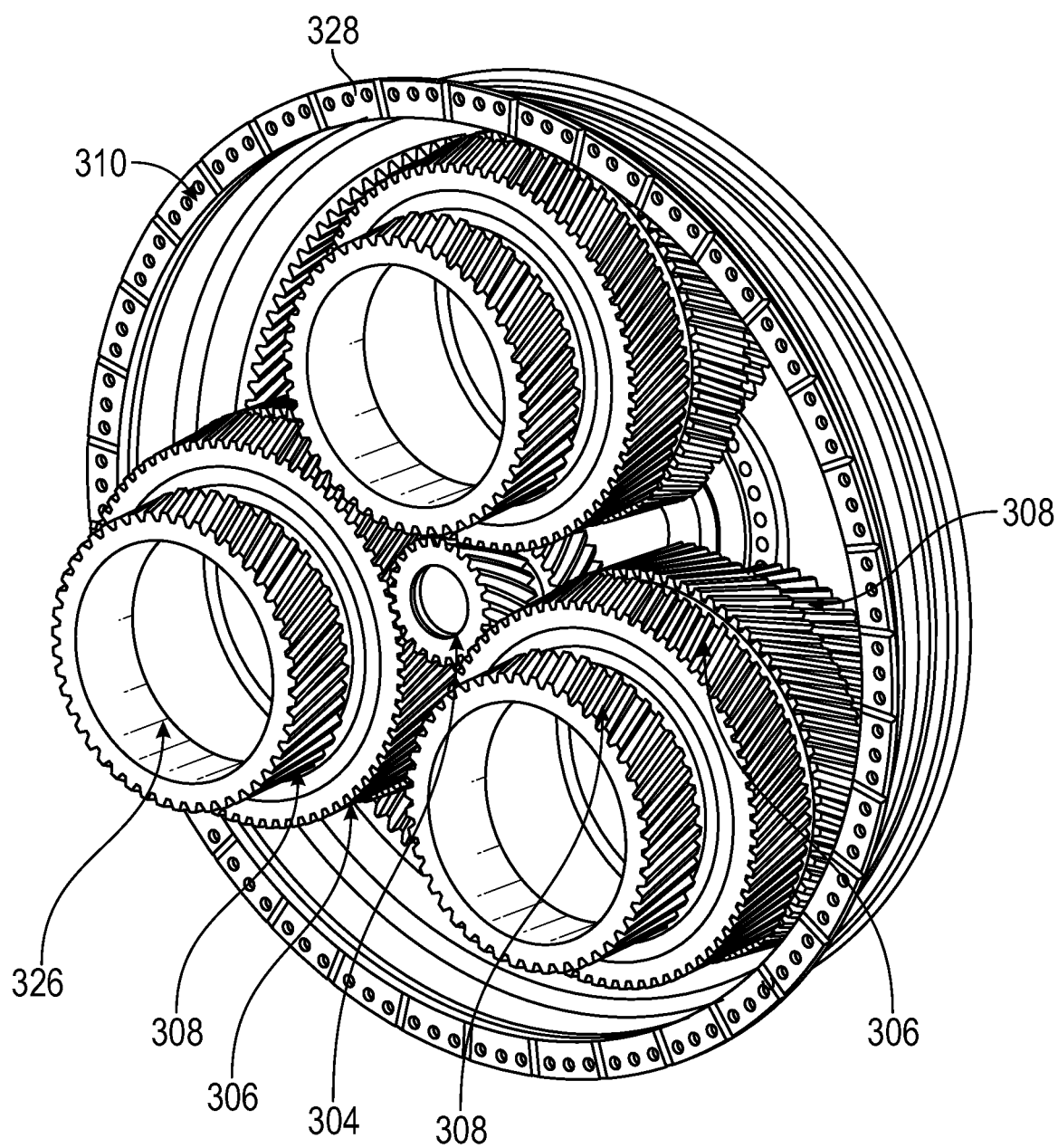
FIG. 7 is a schematic illustration of an exemplary gear assembly with compound symmetry, with a portion of a ring gear removed for clarity.

FIG. 5 illustrates one or more layshaft pins 326 and compound planet gears 306, 308. FIGS. 6 and 7 illustrate the layshaft pins 326, compound planet gears 306, 308, and a sun gear 304 with a ring gear 310 (FIG. 6) and with a portion of the ring gear removed (FIG. 7). In the embodiments shown in FIGS. 6 and 7, three compound planet gears are provided (306, 308) and the ring gear 310 comprises two halves with an interconnecting flanged portion 328. FIG. 7 also discloses a plurality of radial passages for oil scavenging.

Figure 8:
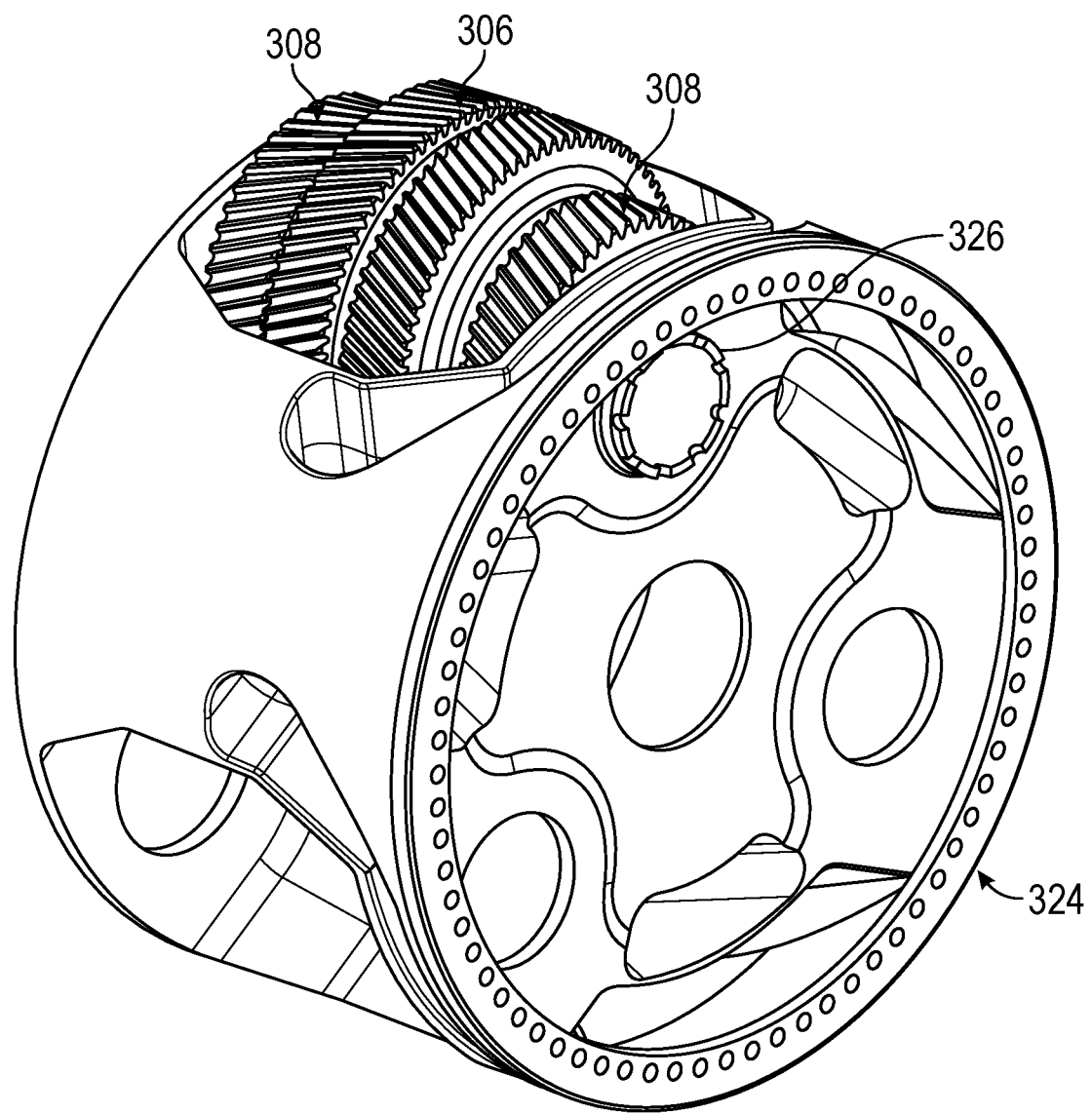
FIG. 8 is a schematic illustration of an exemplary planet carrier with a compound planet gear.
Figure 9:
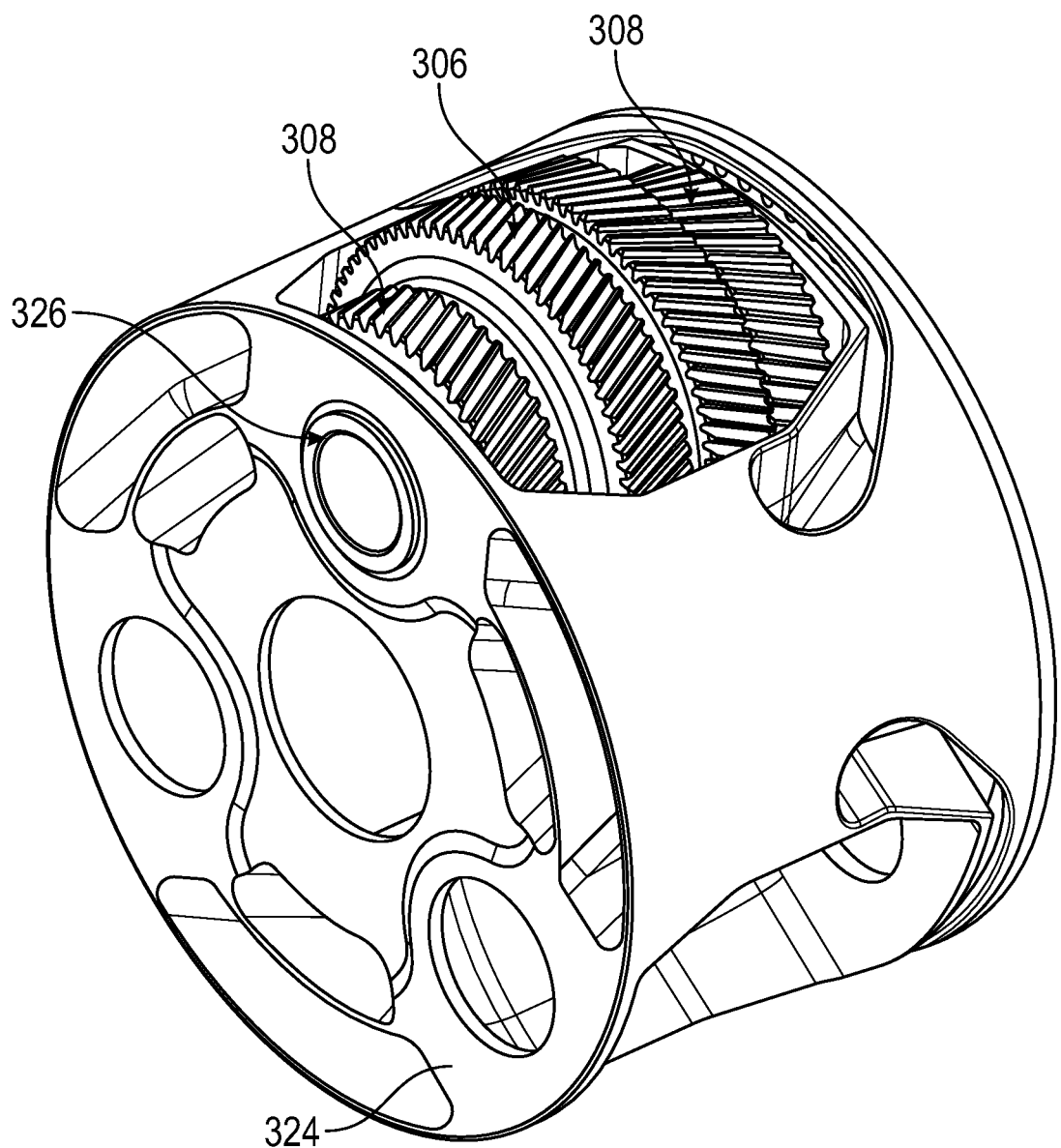
FIG. 9 is another schematic illustration of an exemplary planet carrier with a compound planet gear.

FIGS. 8 and 9 illustrate a planet gear carrier 324 with a single compound planet gear (306, 308) provided therein for clarity. The layshaft pin 326 extends through an opening in the fore and aft sides of the planet gear carrier 324. In some embodiments, the carrier can be connected to the engine frame via a flexible support system, with the flexible support system being configured to collect oil and scavenge oil via holes at a lower portion.

In some embodiments, the gear ratio split between the first and second stages can range from 40% to 60% for each stage (i.e., from 40% to 60% for the first stage and from 60% to 40% for the second stage).

As discussed above, in some embodiments, the sun gear 304, planet gears 306, 308, and ring gear 310 can be double helical gears with first and second sets of helical teeth that are inclined at an acute angle relative to each other.

Figure 3:
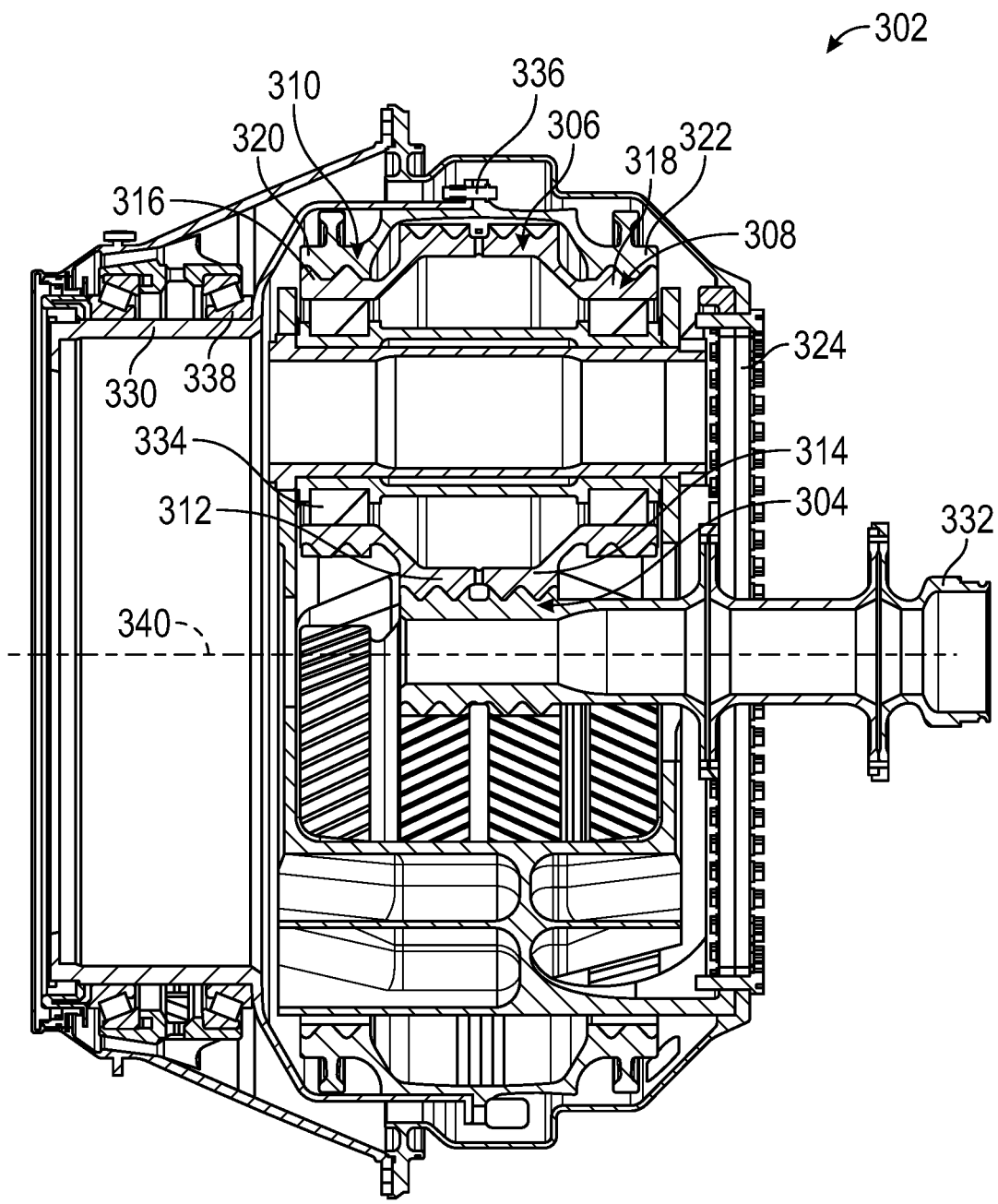
FIG. 3 is a schematic illustration of an exemplary gear assembly.
Figure 4:
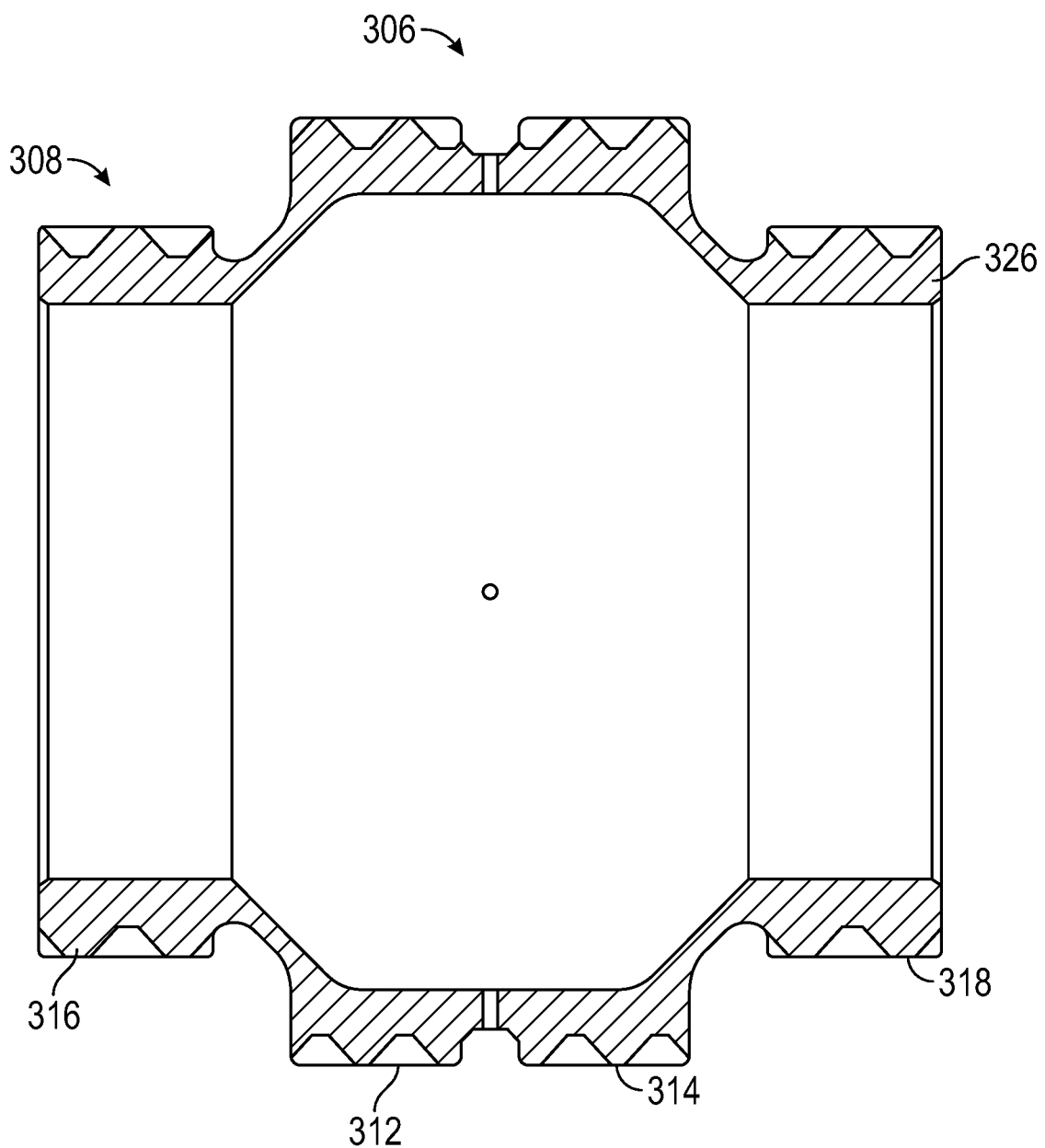
FIG. 4 is a cross-sectional view of an exemplary planet gear layshaft.

In the embodiment shown in FIG. 3, a gear assembly 302 is a star gear configuration in which the planet carrier is generally fixed (e.g., static) within the engine by support structure. The sun gear 304 is driven by an input shaft 332 (e.g., a low-speed shaft). A planet gear carrier 324 is rotatably coupled to a layshaft of the compound planet gears 306, 308, and the ring gear 310 is configured to rotate about a longitudinal engine axis centerline 340 in a circumferential direction, which in turn drives the power output source (e.g., a fan shaft) that is coupled to and configured to rotate with the ring gear to drive the fan assembly. In this embodiment, the low-speed shaft 332 rotates in a circumferential direction that is the opposite of the direction in which a fan drive shaft 330 rotates.

In other embodiments, the gear assembly can have a planetary configuration in which the ring gear is fixed (e.g., static) within the engine by a support structure. The sun gear is driven by an input shaft (i.e., low-speed shaft) and instead of the ring gear rotating, the planet carrier rotates in the same direction of the low-speed shaft rotation direction, to drive the power output source (e.g., a fan shaft) and the fan assembly.

Referring again to FIG. 3, the ring gear 310 is coupled to the fan drive shaft 330 to drive the fans. The sun gear 304 is coupled to an input power source (e.g., input shaft 332). In some embodiments, the input shaft can be integrally formed with the sun gear. The bi-helical meshes of the planet gears axially balance the load over the four (phased) gear sets of each compound planet gear. The second stage of planet gears 308 can be supported by two rows of cylindrical roller bearings 334 at the planet bore. In addition, the fan drive shaft 330 can be supported by tapered roller bearings or angular ball bearings 338, which supports the fan drive shaft 330 in an axially compact manner. In some embodiments, the roller bearings 334 can be formed from a ceramic material. In some embodiments, the roller bearings 334 can be lubricated by under-race lubrication, in which lubrication is directed under the inner race and forced out through a plurality of holes in the inner race. In some embodiments, as shown in FIG. 3, an inner supporting element of both sets of the roller bearings 334 can be a solid unique element.

In some embodiments, one of the pair of gear sets (e.g., one of the first and second gear sets, one of the third or fourth gear sets) is angularly clocked by a set amount of gear pitch relative to the other gear set. For example, the teeth of the first gear set can be angularly clocked by a first amount of the gear pitch relative to the teeth of the second gear set. The first amount can be between one fourth and one half. Similarly, the teeth of the third gear set can be angularly clocked by a second amount of the gear pitch relative to the teeth of the fourth gear set. The second amount can be between one fourth and one half.

The following are exemplary gear assemblies that can reverse the rotational direction of a turbofan engine according to the examples disclosed herein. In this way an aircraft can comprise at least one turbofan engine rotating in a first direction and at least one turbofan engine rotating in a second direction. For example, an aircraft with a pair of turbofan engines can include a first turbofan engine having fan blades rotating in a first rotational direction (e.g., clockwise or counterclockwise), and a second turbofan engine having fan blades rotating in a second rotating direction (e.g., clockwise or counterclockwise) that is opposite to the first rotational direction. For aircraft with more than two turbofan engines, the turbofan engines on the same side of the aircraft body can rotate in the same direction relative to each other, or different directions. Such assemblies may replace or be used with any of the gear assemblies previously described, and can be incorporated into any engine design, including those discussed above.

Figure 10:
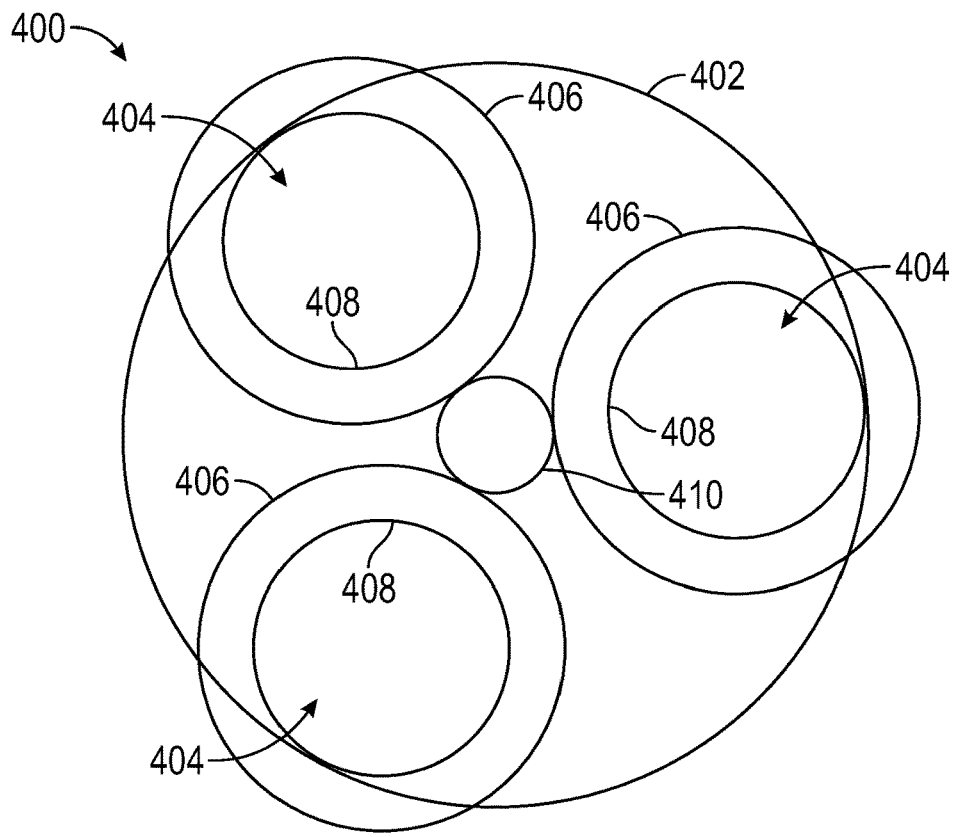
FIG. 10 is a schematic illustration of a gear assembly according to one example, having a sun gear, three compound planet gears, and a ring gear.
Figure 11:
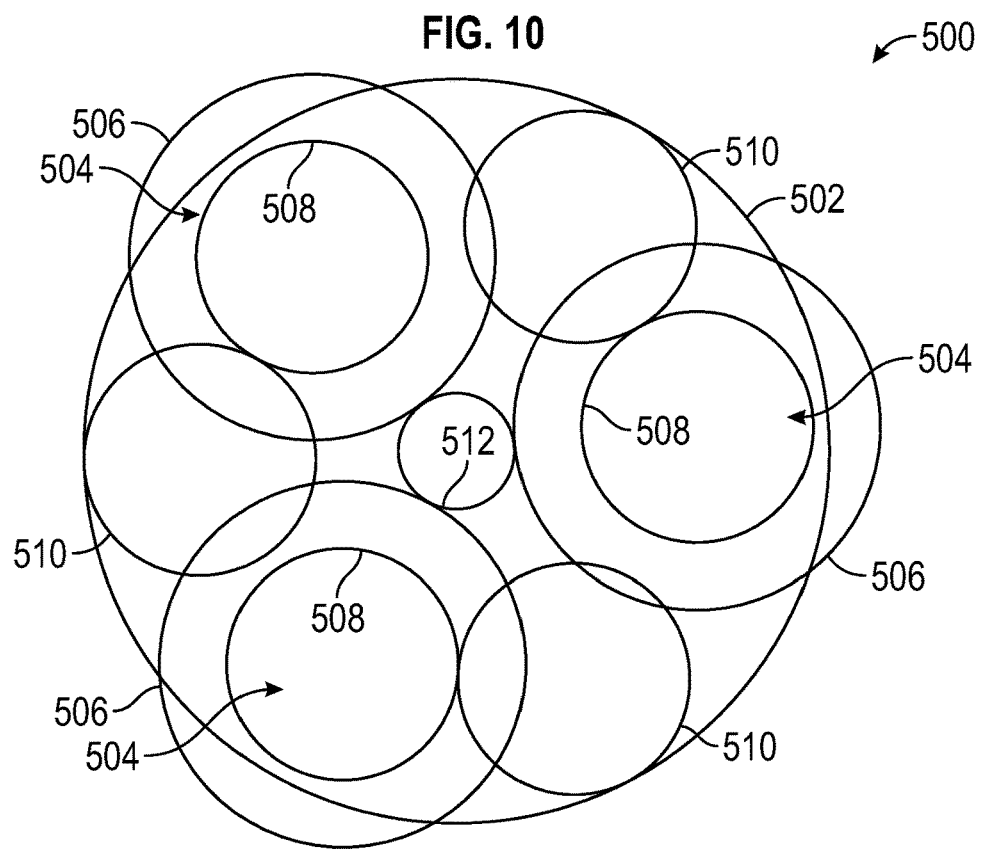
FIG. 11 is a schematic illustration of a gear assembly according to another example having a sun gear, three compound planet gears, three idler gears, and a ring gear.

In one embodiment, the direction of a second turbofan engine of a pair of turbofan engines can be reversed while keeping a substantially similar configuration for the engine components by introducing a plurality of idler gears to the gear assembly driving the fan blades of the turbofan engine. FIGS. 10 and 11 show two exemplary gear assembly configurations for reversing the rotational direction of one turbofan engine of a pair of turbofan engines relative to the rotational direction of the other turbofan engine.

FIG. 10 shows an epicyclic gear assembly 400 for use in the first turbofan engine of the pair of turbofan engines similar to that illustrated in FIGS. 6 and 7. Gear assembly 400 can be a star configuration with a ring gear 402, three compound planet gears 404 having a first stage 406 and a second stage 408, and a sun gear 410. In operation, sun gear 410 is driven by an input shaft driven by the core engine output of the first engine in a first rotational direction (e.g., clockwise or counterclockwise). The sun gear 410 engages with the first stage 406 of the planet gear 404, causing the first stage 406 and the second stage 408 of the planet gear to rotate in a second rotational direction (e.g., counterclockwise or clockwise) that is opposite to the first rotational direction. The second stage of the planet gear 408 engages with the ring gear 402, causing the ring gear 402 to rotate in the second rotational direction as well (e.g., counterclockwise or clockwise). Ring gear 402 is configured to drive the fan assembly of a turbofan engine such as turbofan engine 100 or 200 in the second rotational direction (e.g., clockwise or counterclockwise). In this way, the fan assembly of the first engine is driven in the opposite rotational direction of the input shaft from the core engine output of the first engine. While the example shown in FIG. 10 shows a gear assembly with three compound planet gears 404, it should be understood that a smaller number of compound planet gears, such as two compound planet gears or one compound planet gear, or a larger number of planet gears, such as four, five, or six planet gears could also be used.

The gear assembly 400 can have a gear ratio between the input and output shafts that is from 6:1 to 14:1, from 6:1 to 12:1, from 7:1 to 11:1, or from 8:1 to 10:1. In certain specific examples, the gear assembly 400 may have a gear ratio of 6:1, 7:1, 8:1, 9:1, 10:1, 11:1, 12:1, 13:1, 14:1, or any gear ratio in between. In one example, the gear assembly has a gear ratio of 8.7:1.

FIG. 11 shows another epicyclic gear assembly 500 suitable for use with the second engine of the pair of turbofan engines. Gear assembly 500 has a ring gear 502, three compound planet gears 504 having a first stage 506 and a second stage 508, a plurality of idler gears 510, and a sun gear 512. In operation, sun gear 512 is driven by a turbine in a first rotational direction (e.g., clockwise or counterclockwise). The sun gear 512 engages with the first stage 506 of the planet gears 504, causing the first stage 506 and the second stage 508 of the planet gears to rotate in a second rotational direction (e.g., counterclockwise or clockwise) opposite to the first rotational direction. The second stage 508 of the planet gears engages the idler gears 510, causing the idler gears 510 to rotate in the first rotational direction (e.g., clockwise or counterclockwise). The idler gears 510 engage the ring gear 502, causing the ring gear 502 to rotate in the first rotational direction (e.g., clockwise or counterclockwise). Ring gear 502 is configured to drive the rotating fan blades of a turbofan engine such as turbofan engine 100 or 200 in the first rotational direction (e.g., clockwise or counterclockwise). In this way, the fan assembly of the second engine is driven in the same rotational direction as the input shaft from the core engine output of the second engine. While the example shown in FIG. 11 shows a gear assembly with three compound planet gears 504, it should be understood that a smaller number of compound planet gears, such as two compound planet gears or one compound planet gear, or a larger number of planet gears, such as four, five, or six planet gears could also be used. It should also be understood that a smaller number of idler gears, such as two idler gears or one idler gear, or a larger number of idler gears, such as four, five, or six idler gears could also be used.

Because the idler gears 510 are positioned between the second stage 508 of the planet gears 504 and the ring gear 502, they may experience cyclical fatigue in two directions, compared with the one direction experienced by the planet gears 504. To address this additional direction of cyclical stress, in some examples, the ring gear 502, the planet gears 504, the idler gears 510, and the sun gear 512, and may be made with a greater gear module (i.e., with thicker teeth) to improve the expected service life of the part before failure necessitates repair or replacement.

Like gear assembly 400, gear assembly 500 can have a gear ratio between the input and output shafts that is from 6:1 to 14:1, from 6:1 to 12:1, from 7:1 to 11:1, or from 8:1 to 10:1. In certain specific examples, the gear assembly 500 may have a gear ratio of 6:1, 7:1, 8:1, 9:1, 10:1, 11:1, 12:1, 13:1, 14:1, or any gear ratio in between. In one example, the gear assembly has a gear ratio of between 8.7:1 to 8.9:1. Preferably, the gear ratios of gear assembly 400 and gear assembly 500 are the same, or similar (e.g., within 5% of one another).

In this way, different turbofan engines (e.g. turbofan engines 100, 200) on the same aircraft can cause the respective fan assemblies to rotate in different directions. In addition, since the gear assemblies are similar except for the idler gears and related aspects, common components can be used in each of the two gear assemblies reducing the number of parts required to assemble and maintain the engines, and the two gear assemblies can achieve the same, or similar, outputs.

In another embodiment, the direction of at least one turbofan engine can be reversed relative to at least one other turbofan engine of an aircraft by arranging the gearbox of one engine in a star configuration and arranging the gearbox of the other engine in a planetary configuration. Thus, for example, a first engine of a pair of engines can include a star configuration gear assembly (with a fixed or static planet gear carrier and a rotating ring gear attached to the engine power output shaft) and a second engine can include a gear assembly in a planetary configuration (with a fixed or static ring gear and a rotating planet gear carrier attached to the engine power output shaft).

The first engine can include an epicyclic gear assembly in the star configuration, such as the assembly illustrated in FIG. 3. As discussed above, the sun gear 304 of gear assembly 302 is coupled to an input power source (e.g., input shaft 332), and can in some embodiments be integrally formed with the input shaft 332. The sun gear 304 rotates in a first rotational direction (e.g., clockwise or counterclockwise) and engages a first gear set 312 and a second gear set 314 of the first stage planet gears 306, which rotate in a second rotational direction (e.g., counterclockwise or clockwise) that is opposite to the first rotational direction. A third gear set 316 and a fourth gear set 318 of the second stage planet gears 308 engage a first ring gear set 320 and a second ring gear set 322 of the ring gear 310, which rotate in the second rotational direction (e.g., counterclockwise or clockwise). The ring gear 310 is fixed to the fan drive shaft 330, which drives the power output source (e.g., fan shaft 330) that is coupled to and configured to rotate with the ring gear to drive the fan assembly in the second rotational direction (e.g., counterclockwise or clockwise). In this way, the fan assembly of the first engine is driven in the opposite rotational direction of the input shaft from the core engine output of the first engine. The ring gear 310 can, in some examples, be attached to the fan drive shaft 330 by a plurality of pins or bolts 336.

The gear assembly of the first engine can have a gear ratio between input and output shafts that is from 6:1 to 14:1, from 6:1 to 12:1, from 7:1 to 11:1, or from 8:1 to 10:1. In certain specific examples, the gear assembly 400 may have a gear ratio of 6:1, 7:1, 8:1, 9:1, 10:1, 11:1, 12:1, 13:1, 14:1, or any gear ratio in between. In one example, the gear assembly has a gear ratio of 8.7:1.

Figure 12:
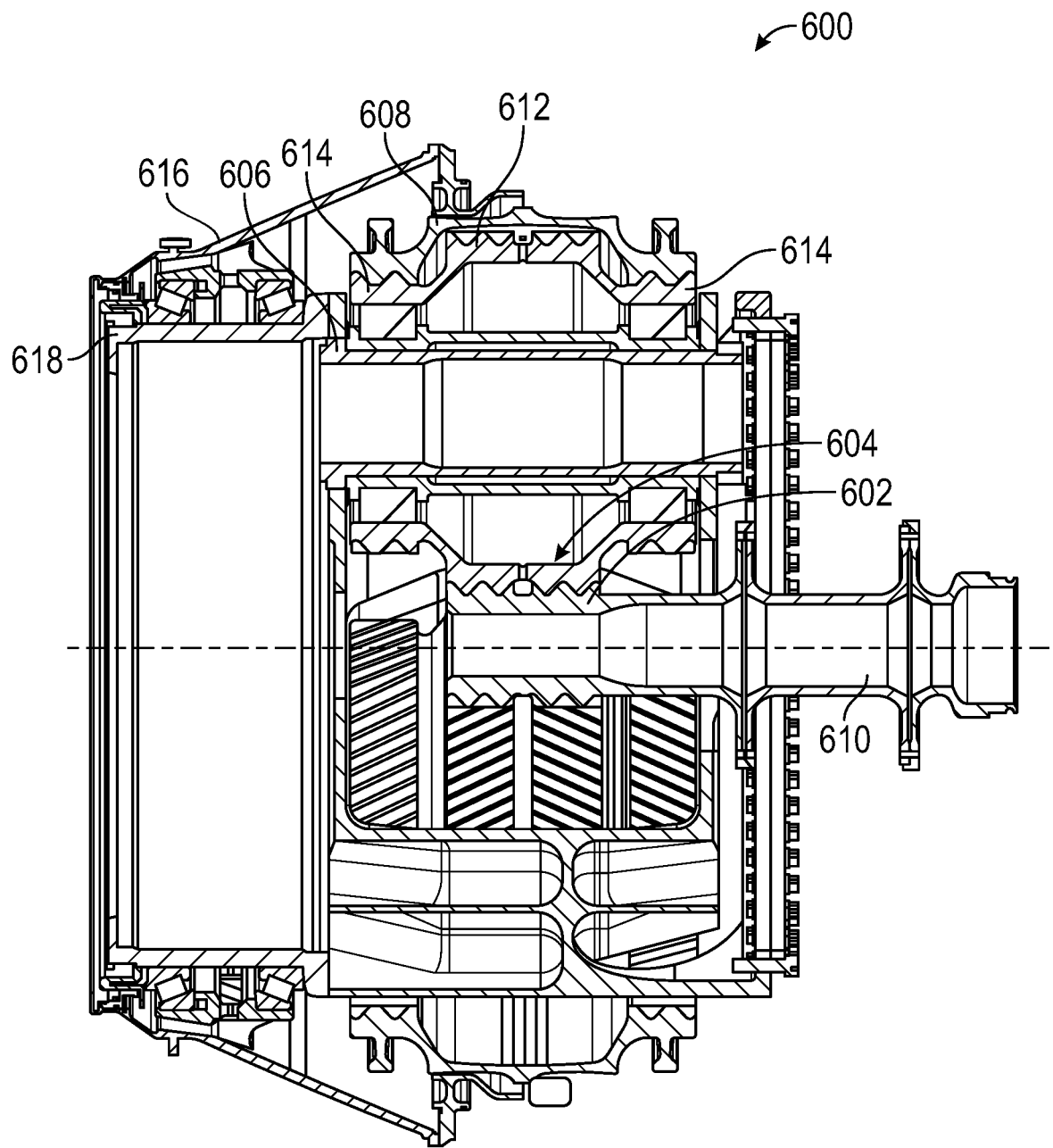
FIG. 12 is a schematic illustration of an exemplary gear assembly with the ring gear affixed to the turbomachine housing.

The second engine of the pair of engines may include an epicyclic gear assembly in a planetary configuration such as the example illustrated in FIG. 12. A gearbox 600 has a sun gear 602, a plurality of compound planet gears 604, a planet gear carrier 606, and a stationary ring gear 608. The sun gear 602 is coupled to an input power source (e.g., input shaft 610) which drives the sun gear 602 in a first rotational direction (e.g., clockwise or counterclockwise). In some embodiments, the sun gear 602 can be integrally formed with the input shaft 610. The compound planet gears 604 are retained within the planet gear carrier 606. The sun gear 602 engages a first stage 612 of each of the compound planet gears 604, which rotate in a second rotational direction (e.g., counterclockwise or clockwise) that is opposite to the first rotational direction. The planet gears 604 have a second stage 614 which engage with the ring gear 608. The compound planet gears 604 travel within the ring gear in a direction opposite to their own rotational direction, that is planet gears 604 rotating in a clockwise direction will travel counterclockwise within the ring gear 608, and compound planet gears 604 rotating in a counterclockwise direction will travel clockwise within the ring gear 608.

The ring gear 608 can be fixed to the engine housing or to a flexible support system and does not rotate relative to the engine housing. In some examples, the ring gear 608 can be affixed to a stationary engine housing 616. In this way, the ring gear 608 remains stationary relative to the engine housing 616, and the planet gear carrier 606 moves with the planet gears 604 in the first rotational direction. The planet gear carrier 606 is attached to a power output source (e.g., a fan shaft 618), which drives the fan assembly in the first rotational direction. In this way, the fan assembly of the second engine is driven in the same rotational direction as the input shaft from the core engine output of the first engine.

In this embodiment, the gear assemblies of the first engine and second engine can both have a gear ratio is from 7:1 to 15:1, from 7:1 to 13:1, from 8:1 to 12:1, or from 9:1 to 11:1. In certain specific examples, the gear assembly 600 may have a gear ratio of 7:1, 8:1, 9:1, 10:1, 11:1, 12:1, 13:1, 14:1, 15:1, or any gear ratio in between. In one example, the gear assembly has a gear ratio of 9.7:1. Because the gear ratio of gear assembly 600 can, in some examples, be higher than the gear ratio of gear assembly 300, for example higher by 1, it may be necessary to run any engine using gear assembly 600 under a different input speed supplied by the core engine driving the second engine of the pair of engines to equalize the rotation speeds of the fan assemblies of the first engine and the second engine. Alternatively, the star gear assembly can be sized up to accommodate a higher gear ratio (e.g., to equal or approximate the gear ratio of the gear assembly in the planetary configuration) or a secondary gear assembly may be included in the second engine, which modifies the rotational speed of the core engine output of one of the turbofan engines (e.g., the second turbofan engine), such that the rotational speed of input shaft 610 differs from the rotation speed of input shaft 332 in order to compensate for the difference in gear ratios of the gear assemblies.

In this way, the turbofan engines (e.g. turbofan engines 100, 200) of an aircraft can be configured such that the fan assembly of the first engine rotates in a direction opposite to the rotational direction of the core engine output of the first engine, and the fan assembly of the second engine rotates in the same direction as the rotational direction of the core engine output of the second engine. Advantageously, this option can be implemented using nearly identical engine components for both gear assemblies, changing only which components of the engine the gear carrier and the ring gear are attached to, and incorporating additional components or a secondary gear assembly to equalize the rotational speed of the fan assembly of the first engine and the fan assembly of the second engine.

Figure 13:
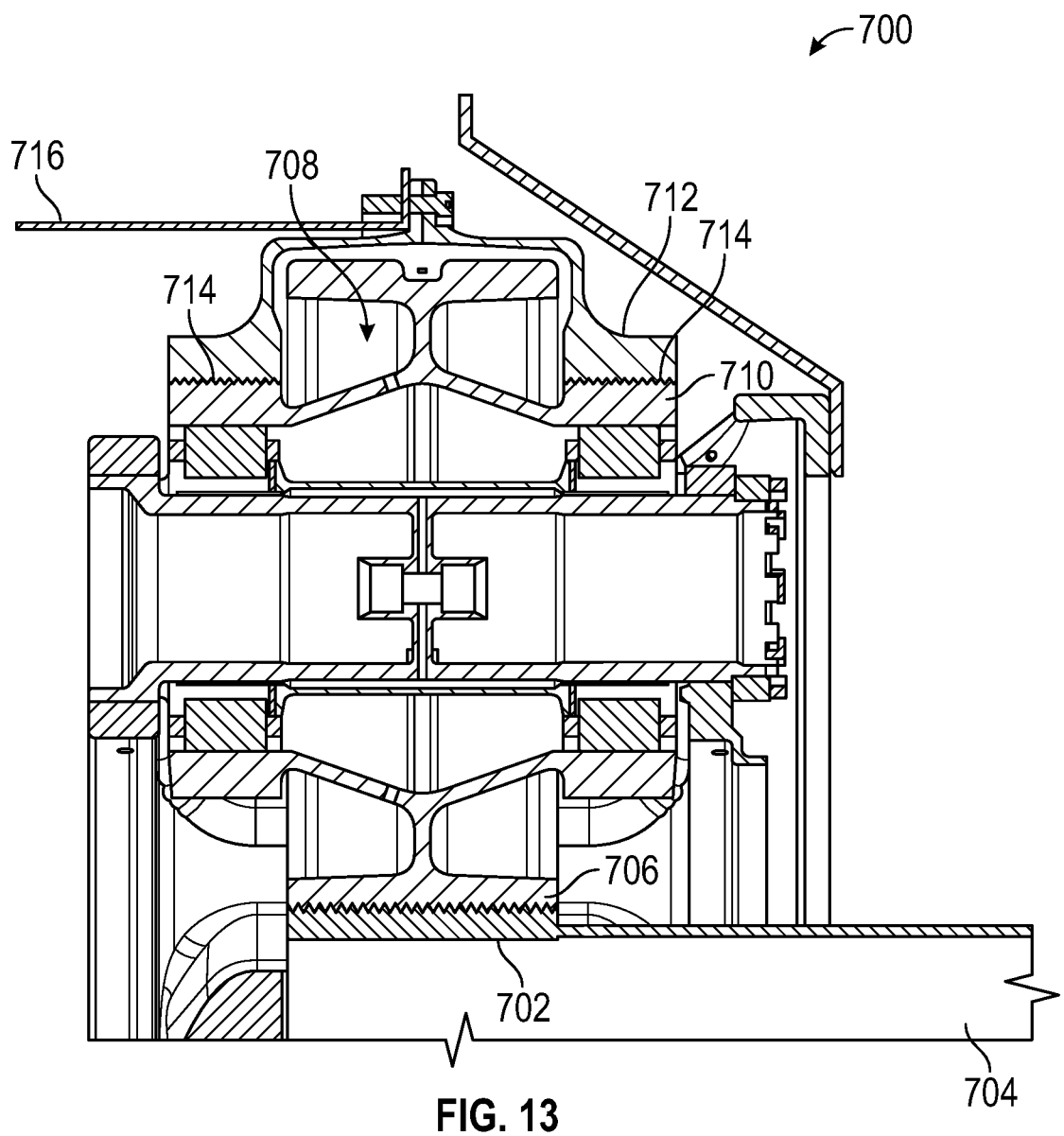
FIG. 13 is a schematic illustration showing a portion of the gear assembly in FIG. 3.
Figure 14:
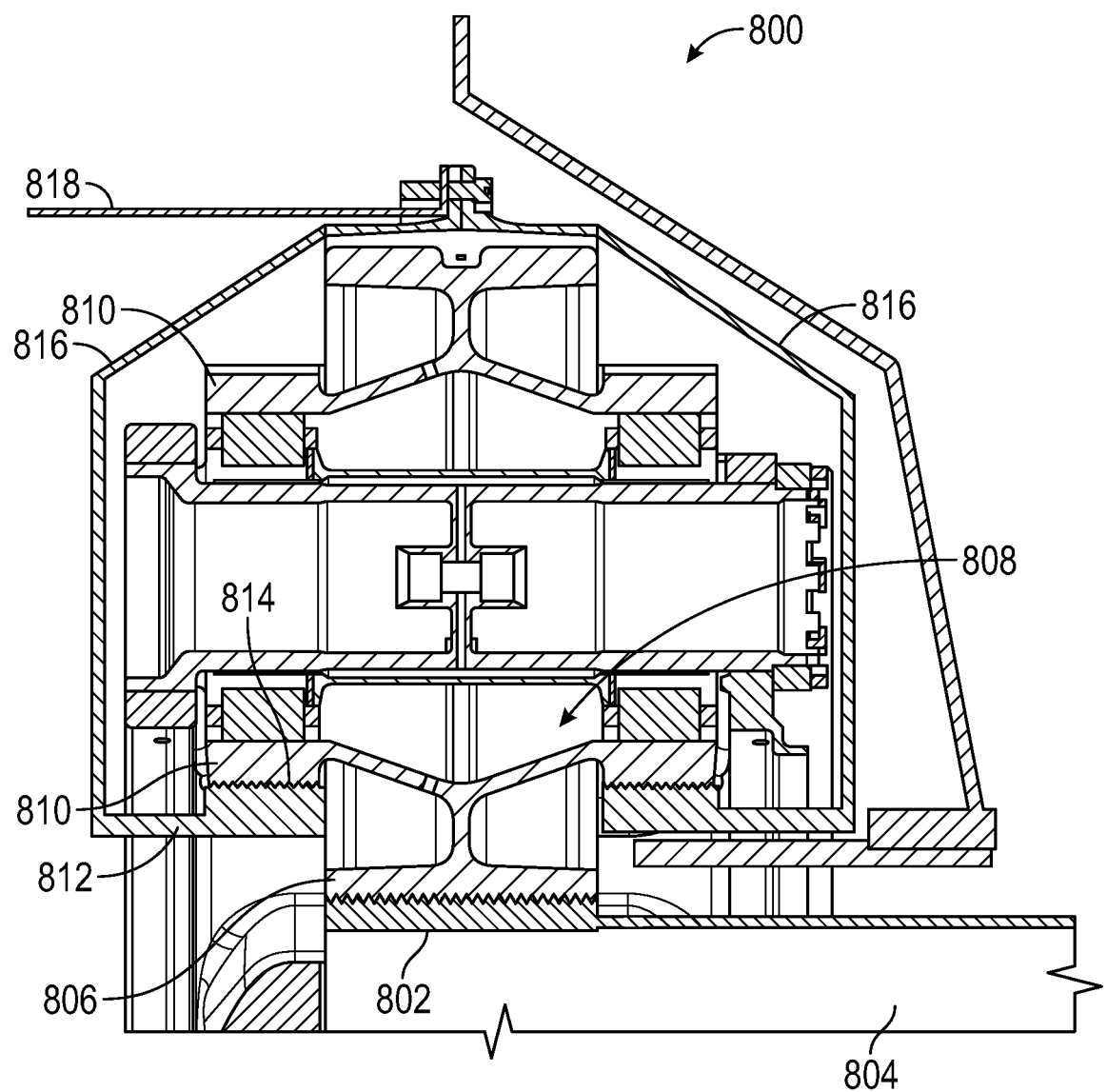
FIG. 14 is a schematic illustration showing the gear assembly of FIG. 13 modified to drive the output shaft off of a secondary sun gear.

FIGS. 13 and 14 illustrate another embodiment of gear assemblies configured to provide rotation of fan assemblies in different directions. In this example, the power output source (e.g., the fan shaft) of at least one of the turbofan engines can be coupled to a second sun gear that is engaged with the second stage planet gears of a plurality of compound planet gears. In this way, the rotational direction of the power output source of at least one engine will be reversed relative to the rotational direction of at least one other engine of an aircraft.

According to one example solution, the first engine can include an epicyclic gear assembly similar to gearbox assembly 302. FIG. 13 shows a schematic of a gear assembly 700 of the first engine. Gear assembly 700 comprises a sun gear 702, which is driven by an input shaft 704. In some embodiments, the sun gear 702 and the input shaft 704 can be integrally formed. The sun gear 702 rotates in a first rotational direction (e.g., clockwise or counterclockwise) and engages a first stage 706 of each of a plurality of compound planet gears 708 which rotate in a second rotational direction (e.g., counterclockwise or clockwise) that is opposite to the first rotational direction. The compound planet gears 708 have a second stage 710 that rotates with the first stage 706, and engages a ring gear 712. The ring gear 712 is disposed radially outwards from the compound planet gears 708 and engages the second stage 710 of the compound planet gears at a radially outward face 714. The ring gear 712 rotates in the second rotational direction (e.g., counterclockwise or clockwise) with the compound planet gears 708. The ring gear 712 is coupled to configured to rotate with a drive shaft 716, which drives a power output source such as a fan shaft and drives a fan assembly of the turbofan engine.

Turning now to FIG. 14, which shows a schematic of a gear assembly which is suitable for use with the second engine, gear assembly 800 comprises a first sun gear 802 which is driven by an input shaft 804. In some embodiments, the sun gear 802 and the input shaft 804 can be integrally formed. The sun gear 802 rotates in a first rotational direction (e.g., clockwise or counterclockwise) and engages a first stage 806 of each of a plurality of compound planet gears 808, which rotate in a second rotational direction (e.g., counterclockwise or clockwise) that is opposite to the first rotational direction. The compound planet gears 808 have a second stage 810 that rotates with the first stage 806 and engages a second sun gear 812 at a radially inward face 814. The second sun gear 812 is positioned radially inwards from the second stages 810 of the plurality of compound planet gears 808, and rotates in the first rotational direction (e.g., clockwise or counterclockwise). The second sun gear 812 can be attached to a connection frame 816 which extends from the second sun gear 812 to a drive shaft 818, which drives a power output source such as a fan shaft and drives a fan assembly of the turbofan engine.

The gear assemblies of both the first and second engines can range from 6:1 to 14:1, from 6:1 to 12:1, from 7:1 to 11:1, or from 8:1 to 10:1. In certain specific examples, the gear assembly 400 may have a gear ratio of 6:1, 7:1, 8:1, 9:1, 10:1, 11:1, 12:1, 13:1, 14:1, or any gear ratio in between.

Thus, turbofan engines can be configured such that the fan assembly of the first engine rotates in a direction opposite to the rotational direction of the fan assembly of the second engine. Advantageously, many components of the two gear assemblies can be the same or similar. Accordingly, both engines can have similar performance characteristics such as efficiency, size, weight, and part count, and require only minimal adjustments to equalize engine output performance.

In another embodiment, directions of at least one fan assembly of an aircraft can be reversed, relative to at least one other fan assembly of the aircraft through the use of a secondary gearbox between the input shaft of the primary gearbox and the core engine. In this way, the rotational direction of the fan assembly of the second engine of the pair can be reversed, while using the same, or similar, primary gearbox and the same core engine configuration for both engines.

According to one example, the first engine can include a gear assembly similar to gearbox assembly 302 as illustrated in FIG. 3. As discussed above the sun gear 304 of gear assembly 302 is coupled to an input power source (e.g., input shaft 332), and can in some embodiments be integrally formed with the input shaft 332. The sun gear 304 rotates in a first rotational direction (e.g., clockwise or counterclockwise) and engages the first gear set 312 and second gear set 314 of the first stage planet gears 306, which rotate in a second rotational direction (e.g., counterclockwise or clockwise) that is opposite to the first rotational direction. The third gear set 316 and fourth gear set 318 of the second stage planet gears 308 engage the first ring gear set 320 and the second ring gear set 322 of the ring gear 310, which rotates in the second rotational direction (e.g., counterclockwise or clockwise). The ring gear 310 is fixed to the fan drive shaft 330, which drives the power output source (e.g., fan shaft 330) that is coupled to and configured to rotate with the ring gear to drive the fan assembly in the second rotational direction (e.g., counterclockwise or clockwise).

Figure 15:
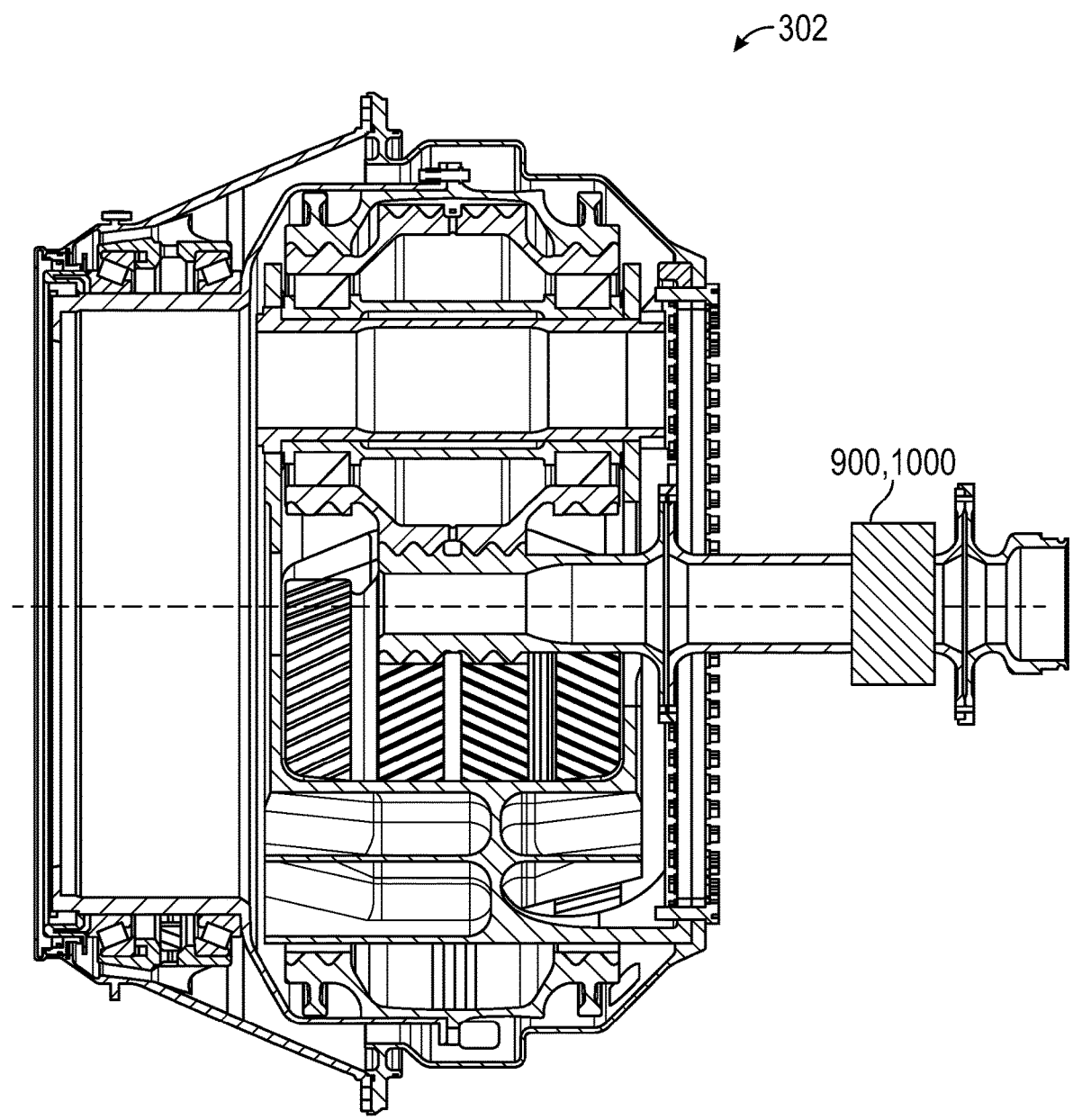
FIG. 15 is a schematic illustration of the gear assembly of FIG. 13 with a secondary gear assembly between the core engine output and the input shaft.
Figure 16:
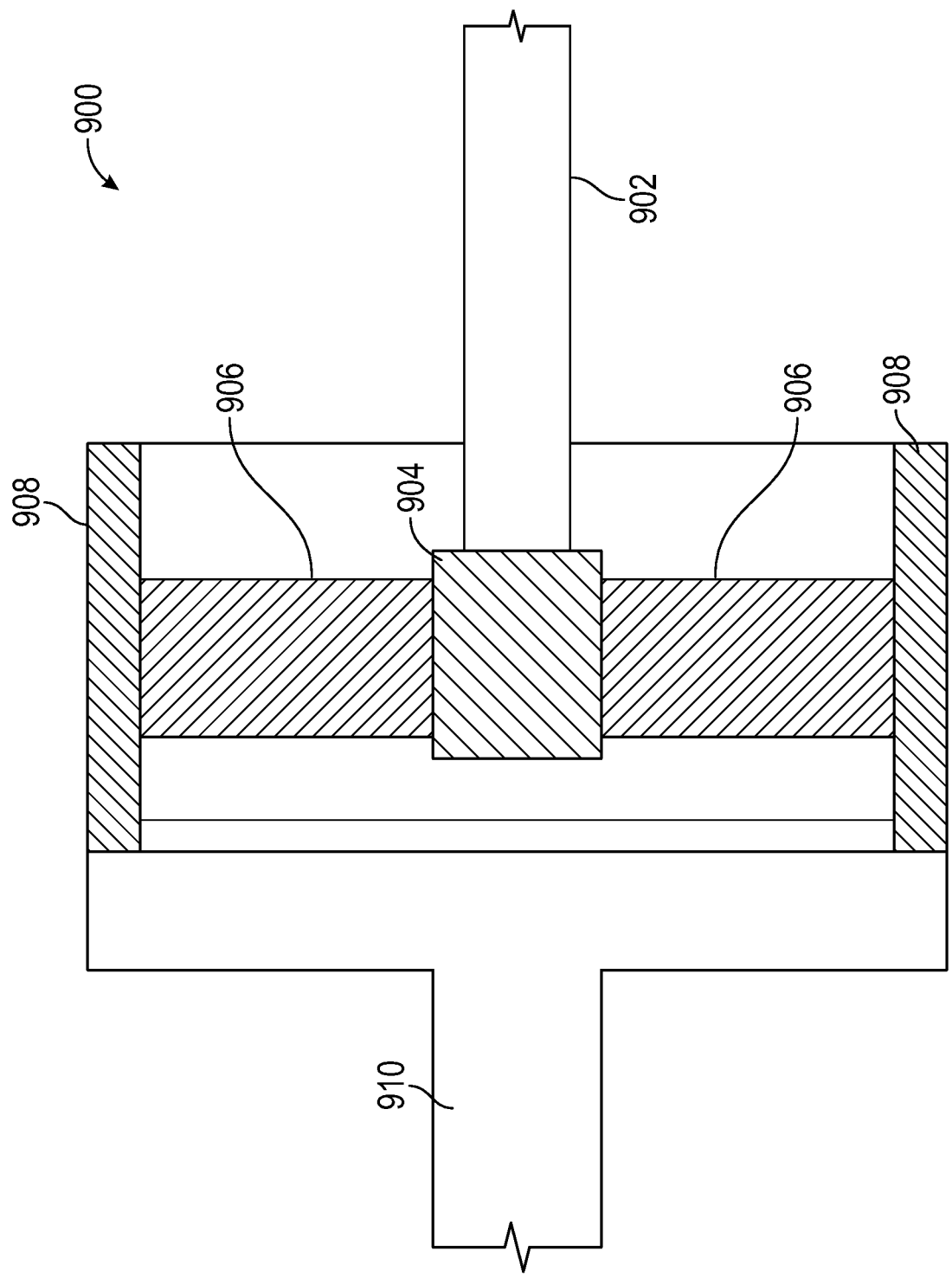
FIG. 16. is a schematic illustration of the secondary gear assembly of FIG. 15. according to one example.

Turning now to FIG. 15, the second engine can include a primary gear assembly like that of the first engine (e.g., gear assembly 302), and a secondary gear assembly (e.g. a secondary gear 900, 1000) located between the core engine and the input shaft 332. In some examples, the secondary gear assembly can be another epicyclic gear, such as epicyclic gear 900 in a star configuration, illustrated in greater detail. As shown in FIG. 16, secondary gear assembly 900 can include a secondary gear input shaft 902, a sun gear 904, a plurality of planet gears 906, and a ring gear 908. Secondary gear input shaft 902 can connect the core engine to the sun gear 904, driving the sun gear 904 in a first rotational direction (e.g., clockwise or counterclockwise). In some embodiments the sun gear 904 can be integrally formed with secondary gear input shaft 902. The planet gears 906 engage simultaneously with the rotating sun gear 904 and the ring gear 908, and rotate in a second rotational direction (e.g., counterclockwise or clockwise) that is opposite the first rotational direction. The ring gear 908 is driven by the planet gears and rotates in the second rotational direction (e.g., counterclockwise or clockwise) and drives a secondary gear output shaft 910 in the second rotational direction.

The secondary gear output shaft 910 can be configured to serve as an input shaft for the primary gear assembly (e.g., input shaft 332 of gear assembly 302). In this way, the secondary gear assembly can reverse the rotational direction of the core engine input before it reaches the primary gear assembly, thereby reversing the rotational direction of the fan assembly of the second engine to the second rotational direction. It is to be understood that while FIG. 16 shows a secondary gear assembly 900 in a star configuration, this is an exemplary illustration only, and any secondary gear assembly capable of reversing the rotational output of the core engine may be used instead.

In such examples, the total combined gear ratio of the primary gear assembly 302 and the secondary gear assembly 900 of the second engine should be equivalent or approximately equivalent to the gear ratio of the gear assembly of the first engine. For example, if the gear assembly of the first engine has a gear ratio of 9:1, the second engine could use a primary gear assembly 302 with a gear ratio of 4.5:1 and a secondary gear assembly 900 with a gear ratio of 2:1.

Figure 17:
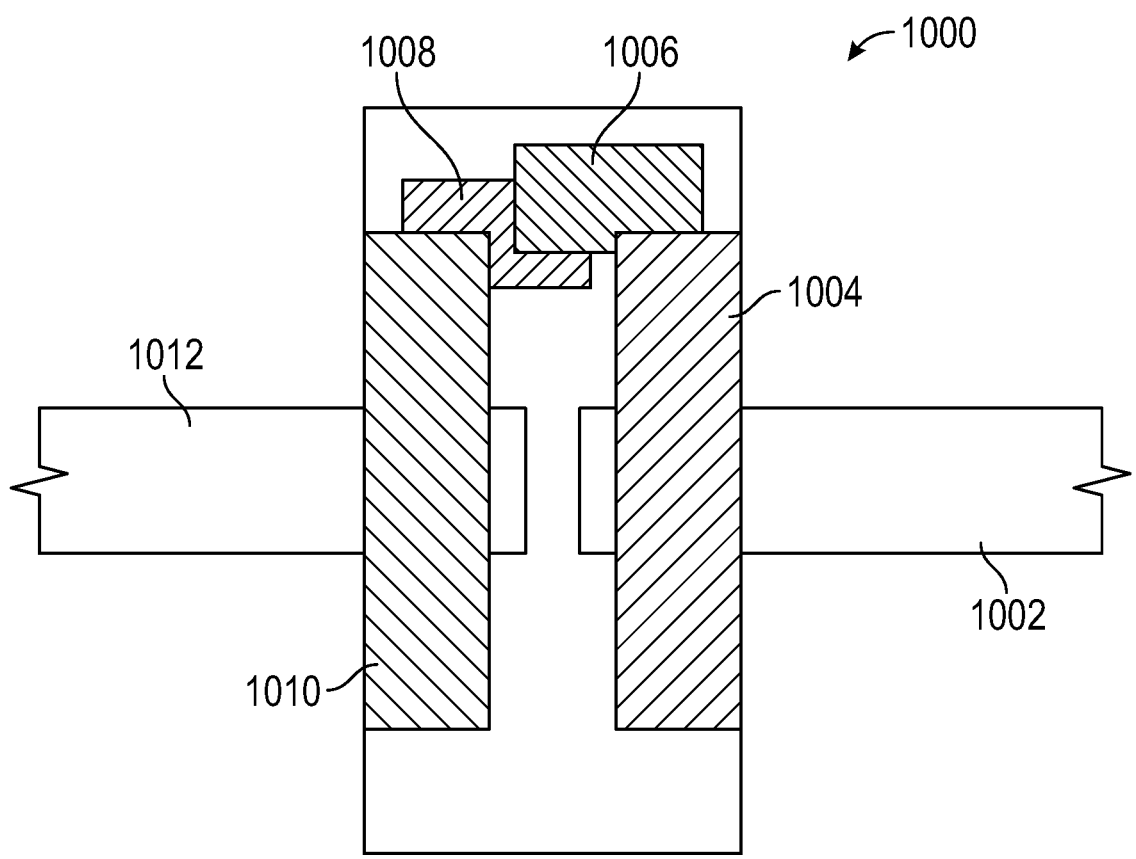
FIG. 17. is a schematic illustration of the secondary gear assembly of FIG. 15 according to another example.

In some examples, the secondary gear assembly can have a gear ratio of 1:1. FIG. 17 illustrates an alternative example secondary gear assembly 1000 having a gear ratio of 1:1. As shown in FIG. 17, secondary gear assembly 1000 can include an input shaft 1002, a drive gear 1004, a first idler gear 1006, a second idler gear 1008, an output gear 1010, and an output shaft 1012. Input shaft 1002 can connect the core engine to the drive gear 1004, causing it to rotate in a first rotational direction (e.g., clockwise or counterclockwise). Drive gear 1004 can engage with the first idler gear 1006, driving it in a second rotational direction (e.g., counterclockwise or clockwise) that is opposite the first rotational direction. The first idler gear 1006 can engage with the second idler gear 1008, driving it in the first rotational direction. The second idler gear 1008 can engage with the output gear 1010, driving it in the second rotational direction. Output gear 1010 is attached to output shaft 1012 (which can also be input shaft 332 of the primary gear assembly 302), driving it in the second rotational direction. In the example shown in FIG. 17, the drive gear 1004 and the output gear 1010 can have the same pitch diameter and tooth geometry, such that the gear ratio between the drive gear 1004 and the output gear 1010 can be 1:1. In this way, the input shaft and the output shaft of the secondary gear assembly 1000 rotate in opposite directions, but at the same rotational speed. In such examples, the primary gear assembly 302 of the second ending and the gear assembly of the first engine could be identical.

Advantageously, this solution allows for identical primary gear assemblies to be used in both the first engine and the second engine of the pair of engines. Instead, the difference in fan rotation is caused by reversing the direction of rotation of the input shaft with a secondary gear assembly.

When the rotational direction of one or more fan assemblies is reversed according to any of the options discussed above, several of the shortcomings of gas turbine engines can be mitigated or corrected while requiring only minimal changes to the overall engine design.

For example, the yaw forces introduced by each engine can be reversed, allowing the yaw forces of engines operating in opposite rotational directions to cancel each other out, reducing or eliminating aircraft yaw and improving operational efficiency of the aircraft. Furthermore, the ability to select rotational direction of engines located near the wingtips may allow for the attenuation of wing tip vortices, resulting in a further improvement to operational efficiency.

For open rotor engines run in opposing directions, possible debris from the engines can be projected away from the fuselage or from neighboring engines, reducing the likelihood of cross-engine debris damage. Additionally, the airflow off of all engines may be directed away from the aircraft cabin, reducing the undesirable noise and turbulence in the passenger compartment.

Because these results can be achieved with only minimal changes to the gearbox designs as disclosed herein, these advantageous results can be obtained without a significant increase in manufacture or maintenance costs for the aircraft.

This written description uses examples to disclose the embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

Clause 1. A turbomachine engine comprising a fan assembly comprising a plurality of fan blades; a core engine comprising a turbine and an input shaft rotatable with the turbine and configured to rotate in a first rotational direction; a first gear assembly that receives the input shaft at a first speed and drives an output shaft coupled to the fan assembly at a second speed, the second speed being slower than the first speed, the gear assembly comprising a sun gear, a plurality of planet gear layshafts that each support a first stage planet gear and a second stage planet gear, and a ring gear, the sun gear disposed about a longitudinal centerline of the gear assembly; and an engine output reversing mechanism configured to reverse a rotational motion of the fan assembly from a second rotational direction that is opposite from the first rotation direction to the first rotational direction; wherein the first stage planet gear comprises a first gear set and a second gear set supported at of the planet gear layshaft, and the second stage planet gear comprises a third gear set supported at a first outer portion of the planet gear layshaft and a fourth gear set supported at a second outer portion of the planet gear layshaft.

Clause 2. The turbomachine engine of any clause herein, especially clause 1, wherein the engine output reversing mechanism is a plurality of idler gears disposed between and engaged with the second stage planet gear and the ring gear configured to rotate in a direction opposite to the planet gears.

Clause 3. The turbomachine engine any clause herein, especially clause 1, wherein the engine output reversing mechanism is a second sun gear disposed radially within and engaged with the second stage planet gear and configured to drive the output shaft, and wherein the ring gear is disengaged from the second stage planet gear.

Clause 4. The turbomachine engine of any clause herein, especially clause 1, wherein the engine output reversing mechanism is a secondary gear assembly configured to reverse the rotational direction of the input shaft.

Clause 5. The turbomachine engine of any clause herein, especially clause 4, wherein the secondary gear assembly is an epicyclic gear assembly with a rotating ring gear, having a ratio of 1:1.

Clause 6. The turbomachine engine of any clause herein, especially clause 1, wherein the first gear assembly is an epicyclic gear in a star gear configuration in which the first stage planet gears and second stage planet gears are contained within a gear carrier and the gear carrier is fixed relative to the turbomachine engine and does not rotate, and the ring gear is configured to drive the output shaft.

Clause 7. The turbomachine engine of any clause herein, especially clause 1, wherein the first gear assembly is an epicyclic gear assembly in a planetary configuration in which the ring gear is fixed relative to the turbomachine engine and does not rotate, the planet gears travel in a rotational direction within the ring gear and are configured to move with a gear carrier that is configured to drive the output shaft.

Clause 8. The turbomachine engine of any clause herein, especially clause 7, wherein the turbomachine engine further includes a second gear assembly configured to alter the rotational speed of the input shaft.

Clause 9. The turbomachine of any clause herein, especially any preceding clause, wherein a gear ratio of the first gear assembly ranges from 6:1 to 14:1, from 6.1 to 12:1, from 7:1 to 11:1, or from 8:1 to 10:1.

Clause 10. The turbomachine of any clause herein, especially any preceding clause, wherein the fan assembly is a single stage of unducted fan blades.

Clause 11. The turbomachine of any clause herein, especially any preceding clause, wherein there are three planet gear layshafts.

Clause 12. An aircraft comprising a first turbofan engine having a first core engine, a first core engine output shaft rotating in a first rotational direction, a first gear assembly, and a first output shaft rotating in a second rotational direction to drive a first fan assembly; and a second turbofan engine having a second core engine, a second core engine output shaft rotating in the first rotational direction, a second gear assembly, and a second output shaft rotating in the first rotational direction to drive a second fan assembly; wherein the first gear assembly receives the first core engine output shaft at a first speed and drives the first output shaft at a second speed that is lower than the first speed; and wherein the second gear assembly receives the second core engine output shaft at a third speed and drives the second output shaft at a fourth speed that is lower than the third speed.

Clause 13. The aircraft of any clause herein, especially clause 12, wherein the first gear assembly comprises a sun gear, a plurality of planet gears, and a first ring gear, wherein the sun gear engages the planet gears, the planet gears engage the first ring gear, and the first ring gear drives the first output shaft; and the second gear assembly comprises a sun gear, a plurality of planet gears, a plurality of idler gears, and a second ring gear wherein the sun gear engages the planet gears, the planet gears engage the idler gears, the idler gears engage the second ring gear, and the second ring gear drives the second output shaft.

Clause 14. The aircraft of any clause herein, especially clause 12, wherein the number of the plurality of idler gears in the second gear assembly is equal to the number of planet gears in the second gear assembly.

Clause 15. The aircraft of any clause herein, especially clause 12, wherein: the first gear assembly comprises a sun gear, a plurality of planet gears, a first gear carrier, and a first ring gear, wherein the planet gears are held in the gear carrier, the gear carrier is attached to a fixed engine housing, the sun gear engages the planet gears, the planet gears engage the first ring gear and the first ring gear drives the first output shaft; and the second gear assembly comprises a sun gear, a plurality of planet gears, a second gear carrier, and a second ring gear, wherein the planet gears are held in the gear carrier, the second ring gear is attached to a fixed engine housing, the sun gear engages the planet gears, the planet gears engage the second ring gear, and the second gear carrier drives the second output shaft.

Clause 16. The aircraft of any clause herein, especially clause 12, wherein: the first gear assembly comprises a sun gear, a plurality of planet gears, and a ring gear wherein the sun gear is engaged with the planet gears, the planet gears are engaged with the ring gear, and the ring gear drives the first output shaft; and the second gear assembly comprises a first sun gear, a plurality of planet gears, and a second sun gear, wherein the first sun gear engages the planet gears, the planet gears engage the second sun gear, and the second sun gear drives the second output shaft.

Clause 17. The aircraft of any clause herein, especially clause 12, wherein the second turbofan engine comprises a third gear assembly located between the second core engine and the second gear assembly, configured to reverse the rotational direction of the second core engine output shaft.

Clause 18. The aircraft of any clause herein, especially clause 17, wherein the third gear assembly has a gear ratio of 1:1.

Clause 19. The turbomachine of any clause herein, especially any preceding clause, wherein a gear ratio of the first gear assembly ranges from 6:1 to 14:1, from 6.1 to 12:1, from 7:1 to 11:1, or from 8:1 to 10:1 and the gear ratio of the second gear assembly ranges from 6:1 to 15:1.

Clause 20. The aircraft of any clause herein, especially clause 12, wherein the first and second fan assemblies each comprise a single stage of unducted fan blades.

Clause 21. The aircraft of any clause herein, especially clause 12, wherein the first and second fan assemblies each comprise a single stage of ducted fan blades.

In view of the many possible embodiments to which the principles of the disclosure may be applied, it should be recognized that the illustrated embodiments are only preferred examples of the disclosure and should not be taken as limiting the scope of the disclosure. Rather, the scope of the disclosure is defined by the following claims.

The invention claimed is:
1. A turbomachine engine comprising:
a fan assembly comprising a plurality of fan blades;
a core engine comprising a turbine and a core engine output shaft rotatable with the turbine and configured to rotate in a first rotational direction;
a secondary gear assembly that receives and is driven by the core engine output shaft and drives a secondary gear output shaft in a second rotational direction that is opposite of the first rotational direction; and a primary gear assembly that receives and is driven by the secondary gear output shaft at a first speed and drives a fan shaft coupled to the fan assembly at a second speed, the second speed being slower than the first speed, the primary gear assembly comprising a sun gear, a plurality of planet gear layshafts that each support a first stage planet gear and a second stage planet gear, and a ring gear, the sun gear disposed about a longitudinal centerline of the primary gear assembly;

wherein the first stage planet gear comprises a first gear set and a second gear set supported at the planet gear layshaft, and the second stage planet gear comprises a third gear set supported at a first outer portion of the planet gear layshaft and a fourth gear set supported at a second outer portion of the planet gear layshaft, wherein the primary gear assembly is an epicyclic gear assembly, wherein the secondary gear assembly is positioned between the turbine and the primary gear assembly, and wherein a gear ratio of the primary gear assembly ranges from 6:1 to 14:1.

2. The turbomachine engine of claim 1, wherein the secondary gear assembly is a gear assembly with a rotating ring gear, having a ratio of 1:1.

3. The turbomachine engine of claim 1, wherein the fan assembly is a single stage of unducted fan blades.

4. The turbomachine engine of claim 1, wherein the secondary gear assembly comprises a drive gear connected to and rotationally coupled with the engine output shaft, a first idler gear engaged with the drive gear, and a second idler gear engaged with the first idler gear, wherein the second idler gear is coupled to an output gear which drives the secondary gear output shaft.

5. The turbomachine engine of claim 4, wherein the drive gear rotates in the first rotational direction, the first idler gear rotates in the second rotational direction, the second idler gear rotates in the first rotational direction, the output gear rotates in the second rotational direction, and the output shaft rotates in the second rotational direction.

6. The turbomachine of claim 4, wherein the drive gear is integrally formed with the core engine output shaft.

7. The turbomachine engine of claim 1, wherein the core engine output shaft is axially aligned and in series with the secondary gear output shaft.

8. An aircraft comprising:
a first turbofan engine having a first core engine, a first core engine output shaft rotating in a first rotational direction, a first gear assembly, and a first output fan drive shaft rotating in a second rotational direction to drive a first fan assembly in the second rotational direction; and
a second turbofan engine having a second core engine, a second core engine output shaft rotating in the first rotational direction, a second gear assembly, a second output fan drive shaft rotating in the first rotational direction to drive a second fan assembly in the first rotational direction, and a third gear assembly comprising a secondary gear output shaft disposed between the second core engine output shaft and the second gear assembly and rotating in the second rotational direction, wherein the first gear assembly receives the first core engine output shaft at a first speed and drives the first output shaft at a second speed that is lower than the first speed;

wherein the third gear assembly receives the second core engine output shaft at a third speed and drives a secondary gear output shaft at the third speed, wherein the second gear assembly receives the secondary gear output shaft at the third speed and drives the second fan drive shaft at a fourth speed that is lower than the third speed, wherein the second core engine output shaft is axially aligned and in series with the secondary gear output shaft and wherein a gear ratio of the first gear assembly ranges from 6:1 to 14:1.

9. The aircraft of claim 8, wherein the third gear assembly is a gear assembly with a rotating ring gear, having a ratio of 1:1.

10. The aircraft of claim 8, wherein the first fan assembly and second fan assembly each comprises a single stage of unducted fan blades.

11. The aircraft of claim 8, wherein the third gear assembly is an epicyclic gear assembly.

12. The aircraft of claim 11, wherein the drive gear rotates in the first rotational direction, the first idler gear rotates in the second rotational direction, the second idler gear rotates in the first rotational direction, the output gear rotates in the second rotational direction, and the output shaft rotates in the second rotational direction.

13. The aircraft of claim 8, wherein the third gear assembly comprises a drive gear coupled to the second core engine output shaft, a first idler gear engaged with the drive gear, a second idler gear engaged with the first idler gear, and an output gear engaged with the second idler gear.

14. A turbomachine engine comprising:
a fan assembly comprising a plurality of fan blades;
a core engine comprising a turbine and a first input shaft rotatable with the turbine and configured to rotate in a first rotational direction;
a secondary gear assembly with a 1:1 gear ratio that receives the first input shaft and is configured to drive a second input shaft in a second rotational direction that is opposite from the first rotational direction; and
a primary gear assembly that receives the second input shaft at a first speed and drives an output shaft coupled to the fan assembly at a second speed, the second speed being slower than the first speed, the primary gear assembly comprising a sun gear, a plurality of planet gear layshafts that each support a first stage planet gear and a second stage planet gear, and a ring gear, the sun gear disposed about a longitudinal centerline of the primary gear assembly;

wherein the first stage planet gear comprises a first gear set and a second gear set supported at the planet gear layshaft, and the second stage planet gear comprises a third gear set supported at a first outer portion of the planet gear layshaft and a fourth gear set supported at a second outer portion of the planet gear layshaft.

* * * * *